US012794751B2

(12) United States Patent
Zhang et al.

(10) Patent No.: US 12,794,751 B2
(45) Date of Patent: Nov. 10, 2026

(54) METHODS AND APPARATUSES FOR ADAPTATION OF COMMUNICATION PARAMETER

(71) Applicant: Telefonaktiebolaget LM Ericsson (publ), Stockholm (SE)

(72) Inventors: Zhan Zhang, Beijing (CN); Mårten Sundberg, Årsta (SE); Hamed Farhadi, Stockholm (SE); David Sandberg, Sunbyberg (SE); Miguel Berg, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/292,119

(22) PCT Filed: Jul. 26, 2021

(86) PCT No.: PCT/CN2021/108445
§ 371 (c)(1),
(2) Date: Jan. 25, 2024

(87) PCT Pub. No.: WO2023/004541
PCT Pub. Date: Feb. 2, 2023

(65) Prior Publication Data
US 2024/0348487 A1 Oct. 17, 2024

(51) Int. Cl.
*H04L 27/34* (2006.01)
*H04L 5/00* (2006.01)

(52) U.S. Cl.
CPC ........ *H04L 27/3405* (2013.01); *H04L 5/0048* (2013.01)

(58) Field of Classification Search
CPC .......................... H04L 27/3405; H04L 5/0048
See application file for complete search history.

(56) References Cited

U.S. PATENT DOCUMENTS 8,675,769 B1 * 3/2014 Eliaz .................... H04L 1/0041 375/135
2010/0272195 A1 * 10/2010 Rao .................... H04L 27/2614 375/346

(Continued)

OTHER PUBLICATIONS

International Search Report and Written Opinion dated Jan. 12, 2022 for International Application No. PCT/CN2021/108445, 17 pages.

(Continued)

*Primary Examiner* — Freshteh N Aghdam
(74) *Attorney, Agent, or Firm* — Sage Patent Group

(57) ABSTRACT

Methods and apparatuses for adaptation of communication parameter are disclosed. According to an embodiment, a transmitter performs a first transmission to a receiver. The transmitter receives, from the receiver, first information related to one or more candidate constellation maps adapted to one or more current operating conditions, or second information usable for deriving the one or more candidate constellation maps. The transmitter determines a target constellation map based at least on the first information or the second information. The transmitter performs a second transmission to the receiver based on the determined target constellation map.

20 Claims, 26 Drawing Sheets

(56) References Cited

U.S. PATENT DOCUMENTS

| | | | | |
|---|---|---|---|---|
| 2011/0150147 A1* | 6/2011 | Yang | H04L 27/34 | 375/340 |
| 2016/0365945 A1* | 12/2016 | Bakulin | H04L 1/0006 | |
| 2018/0176051 A1* | 6/2018 | Qian | H04L 27/2647 | |
| 2023/0198826 A1* | 6/2023 | Huangfu | H04L 43/08 | 375/259 |

OTHER PUBLICATIONS

Omidi, Amir et al.; "Geometric Constellation Shaping Using Initialized Autoencoders"; 2021 IEEE International Black Sea Conference on Communications and Networking (BlackSeaCom); May 24, 2021; XP033969472; 5 pages.

3GPP; Technical Specification Group Radio Access Network; NR; Physical layer procedures for data (Release 16); 3GPP TS 38.214 V16.5.0 (Mar. 2021); France; 171 pages.

* cited by examiner

| Phase noise (max angular uniform noise) [degrees] | Noisy received symbols with optimized constellation map | Optimized constellation map with labeling |
|---|---|---|
| 0 |  |  |
| 10 |  |  |
| 20 |  |  |

METHODS AND APPARATUSES FOR ADAPTATION OF COMMUNICATION PARAMETER

CROSS-REFERENCE TO RELATED APPLICATIONS

This application is a 35 U.S.C § 371 national stage application for International Application No. PCT/CN2021/108445, entitled "METHODS AND APPARATUSES FOR ADAPTATION OF COMMUNICATION PARAMETER", filed on Jul. 26, 2021, assigned to the assignee hereof, and expressly incorporated herein by reference.

TECHNICAL FIELD

Embodiments of the disclosure generally relate to communication, and, more particularly, to methods and apparatuses for adaptation of communication parameter.

BACKGROUND

This section introduces aspects that may facilitate better understanding of the present disclosure. Accordingly, the statements of this section are to be read in this light and are not to be understood as admissions about what is in the prior art or what is not in the prior art.

Modulation schemes used in digital communication typically come from a pre-defined set of constellation points, such as quadrature amplitude modulation (QAM) modulation, or phase shift keying (PSK) modulation. Each point in the constellation represents a modulated symbol and carries the information about the transmitted bit(s) in one or both of amplitude and phase.

For example, for quadrature phase shift keying (QPSK), Table 1 below shows the phase shifts, amplitudes and in-phase/quadrature (I/Q) values of the constellation points of QPSK. FIG. 1 illustrates the constellation points of QPSK in an I/Q diagram. As shown in Table 1 and FIG. 1, the two information bits of the four constellation points are carried by the phase of each point in the I/Q plane.

TABLE 1

Constellation points of QPSK

| I | Q | Phase shift | Amplitude |
|---|---|---|---|
| 0 | 0 | π/4 | 1 |
| 0 | 1 | −π/4 | 1 |
| 1 | 0 | 3π/4 | 1 |
| 1 | 1 | −3π/2 | 1 |

The positions of the constellation points in the I/Q plane are typically designed to achieve good performance under certain conditions, e.g. additive white Gaussian noise (AWGN), and to allow for simple reception (Rx) processing (e.g. using rectangular QPSK, 16QAM, 64QAM).

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for adaptation of communication parameter. In particular, one of the problems to be solved by the disclosure is that the use of traditional modulation schemes may not be suitable when the operating conditions do not match the model assumed when the traditional modulation scheme was designed.

According to a first aspect of the disclosure, there is provided a method performed by a transmitter. The method may comprise performing a first transmission to a receiver. The method may further comprise receiving, from the receiver, first information related to one or more candidate constellation maps adapted to one or more current operating conditions, or second information usable for deriving the one or more candidate constellation maps. The method may further comprise determining a target constellation map based at least on the first information or the second information. The method may further comprise performing a second transmission to the receiver based on the determined target constellation map.

In this way, the constellation map used by the transmitter can be more suitable for the one or more current operating conditions thereby improving link performance.

In an embodiment of the disclosure, determining the target constellation map may comprise: determining, as the target constellation map, one of the one or more candidate constellation maps.

In an embodiment of the disclosure, the target constellation map may be determined based further on third information that is available at the transmitter.

In an embodiment of the disclosure, determining the target constellation map may comprise: determining, as the target constellation map, a different constellation map than the one or more candidate constellation maps, or one of the one or more candidate constellation maps.

In an embodiment of the disclosure, the method may further comprise: informing the receiver of the target constellation map or fourth information usable for deriving the target constellation map.

In an embodiment of the disclosure, the fourth information may be determined based on the second information and third information that is available at the transmitter.

In an embodiment of the disclosure, the target constellation map or the fourth information may be informed by a signaling.

In an embodiment of the disclosure, the method may further comprise: activating the receiver to participate in adaptation of constellation map.

In an embodiment of the disclosure, activating the receiver to participate in adaptation of constellation map may comprise one or more of: transmitting, to the receiver, a configuration for a probing reference signal (PRS) that is to be transmitted to the receiver; allocating, to the receiver, resources for reporting of the first information or the second information to the transmitter; and transmitting, to the receiver, a configuration for reporting of the first information or the second information to the transmitter.

In an embodiment of the disclosure, the method may further comprise: detecting at least one imperfect operating condition experienced or to be experienced by the transmitter. The receiver may be activated in response to the detecting of the at least one imperfect operating condition.

In an embodiment of the disclosure, the method may further comprise: receiving, from the receiver, capability information of the receiver about supporting of adaptation of constellation map.

In an embodiment of the disclosure, the one or more current operating conditions may comprise: at least one imperfect operating condition experienced by the receiver and/or the transmitter.

In an embodiment of the disclosure, the at least one imperfect operating condition experienced by the receiver and/or the transmitter may be caused by hardware impairment of the receiver and/or the transmitter.

In an embodiment of the disclosure, the at least one imperfect operating condition experienced by the receiver and/or the transmitter may comprise one or more of: phase noise; nonlinearity of a power amplifier; filter ripple; in-phase/quadrature (I/Q) gain imbalance; and I/Q phase imbalance.

In an embodiment of the disclosure, the target constellation map may be determined by using a machine learning process.

In an embodiment of the disclosure, the target constellation map may be determined from a pre-defined set of constellation maps.

In an embodiment of the disclosure, the first information may indicate the one or more candidate constellation maps.

In an embodiment of the disclosure, a number of the one or more candidate constellation maps may be more than one. The more than one candidate constellation map may comprise, for each of a plurality of transmission configurations of the transmitter, a set of candidate constellation map(s).

In an embodiment of the disclosure, the first information may further indicate, for each of the one or more candidate constellation maps, a degree of adaptation of the candidate constellation map to the one or more current operating conditions.

In an embodiment of the disclosure, the second information may comprise information related to the one or more current operating conditions.

In an embodiment of the disclosure, the second information may comprise one or more parameters characterizing at least one imperfect operating condition experienced by the receiver and/or the transmitter. Alternatively, the second information may comprise an indicator indicating a type of the at least one imperfect operating condition experienced by the receiver and/or the transmitter.

In an embodiment of the disclosure, the third information may comprise one or more of: at least one imperfect operating condition experienced by the transmitter; information about an upcoming transmission to be performed by the transmitter; and information about available constellation maps supported by the transmitter.

In an embodiment of the disclosure, performing the first transmission may comprise transmitting one or more of: modulated data; and a pre-defined signal.

In an embodiment of the disclosure, the transmitter may be a base station and the receiver may be a terminal device. Alternatively, the transmitter may be a terminal device and the receiver may be a base station.

According to a second aspect of the disclosure, there is provided a method performed by a receiver. The method may comprise receiving a first transmission from a transmitter. The method may further comprise determining first information related to one or more candidate constellation maps adapted to one or more current operating conditions, or second information usable for deriving the one or more candidate constellation maps, based on the received first transmission. The method may further comprise transmitting the first information or the second information to the transmitter.

In this way, it is possible to allow the transmitter to use a constellation map more suitable for the one or more current operating conditions thereby improving link performance.

In an embodiment of the disclosure, the first information related to one candidate constellation map adapted to one or more current operating conditions may be determined. The method may further comprise: receiving a second transmission from the transmitter based on the one candidate constellation map.

In an embodiment of the disclosure, the second information usable for deriving one or more candidate constellation maps may be determined. The method may further comprise determining a target constellation map based on the second information. The method may further comprise receiving a second transmission from the transmitter based on the determined target constellation map.

In an embodiment of the disclosure, the method may further comprise receiving, from the transmitter, third information indicating a target constellation map. The method may further comprise receiving a second transmission from the transmitter based on the indicated target constellation map.

In an embodiment of the disclosure, the second information usable for deriving one or more candidate constellation maps may be determined. The method may further comprise receiving, from the transmitter, fourth information usable for deriving a target constellation map. The method may further comprise determining a target constellation map based on the fourth information. The method may further comprise receiving a second transmission from the transmitter based on the determined target constellation map.

In an embodiment of the disclosure, the third information or the fourth information may be received by a signaling.

In an embodiment of the disclosure, the method may further comprise receiving, from the transmitter, at least one signaling for activating the receiver to participate in adaptation of constellation map.

In an embodiment of the disclosure, the at least one signaling may comprise one or more of: a configuration for a PRS that is to be transmitted to the receiver; a signaling for allocating, to the receiver, resources for reporting of the first information or the second information to the transmitter; and a configuration for reporting of the first information or the second information to the transmitter.

In an embodiment of the disclosure, the method may further comprise: transmitting, to the transmitter, capability information of the receiver about supporting of adaptation of constellation map.

In an embodiment of the disclosure, the one or more current operating conditions may comprise: at least one imperfect operating condition experienced by the receiver and/or the transmitter.

In an embodiment of the disclosure, the at least one imperfect operating condition experienced by the receiver and/or the transmitter may be caused by hardware impairment of the receiver and/or the transmitter.

In an embodiment of the disclosure, the at least one imperfect operating condition experienced by the receiver and/or the transmitter may comprise one or more of: phase noise; nonlinearity of a power amplifier; filter ripple; I/Q gain imbalance; and I/Q phase imbalance.

In an embodiment of the disclosure, the first information may be determined by using a machine learning process.

In an embodiment of the disclosure, the one or more candidate constellation maps may be from a pre-defined set of constellation maps.

In an embodiment of the disclosure, the target constellation map may be determined by using a machine learning process.

In an embodiment of the disclosure, the first information may indicate the one or more candidate constellation maps.

In an embodiment of the disclosure, a number of the one or more candidate constellation maps may be more than one. The more than one candidate constellation map may comprise, for each of a plurality of transmission configurations of the transmitter, a set of candidate constellation map(s).

In an embodiment of the disclosure, the first information may further indicate, for each of the one or more candidate constellation maps, a degree of adaptation of the candidate constellation map to the one or more current operating conditions.

In an embodiment of the disclosure, the second information may comprise information related to the one or more current operating conditions.

In an embodiment of the disclosure, the second information may comprise one or more parameters characterizing at least one imperfect operating condition experienced by the receiver and/or the transmitter. Alternatively, the second information may comprise an indicator indicating a type of the at least one imperfect operating condition experienced by the receiver and/or the transmitter.

In an embodiment of the disclosure, the received first transmission may comprise one or more of: modulated data; and a pre-defined signal.

In an embodiment of the disclosure, the transmitter may be a base station and the receiver may be a terminal device. Alternatively, the transmitter may be a terminal device and the receiver may be a base station.

In an embodiment of the disclosure, the transmitter may be a base station and the receiver may be a terminal device. The method may further comprise providing user data. The method may further comprise forwarding the user data to a host computer via the transmission to the base station.

According to a third aspect of the disclosure, there is provided a method performed by a transmitter. The method may comprise determining a target constellation map adapted to one or more operating conditions. The method may further comprise informing a receiver of the determined target constellation map. The method may further comprise performing a transmission to the receiver based on the determined target constellation map.

In this way, the constellation map used by the transmitter can be more suitable for the one or more operating conditions thereby improving link performance.

In an embodiment of the disclosure, the target constellation map may be informed by a signaling.

In an embodiment of the disclosure, the method may further comprise: detecting at least one imperfect operating condition experienced or to be experienced by the transmitter. The target constellation map may be determined in response to the detecting of the at least one imperfect operating condition.

In an embodiment of the disclosure, the method may further comprise: receiving, from the receiver, capability information of the receiver about supporting of adaptation of constellation map.

In an embodiment of the disclosure, the one or more operating conditions may comprise: at least one imperfect operating condition experienced or to be experienced by the transmitter.

In an embodiment of the disclosure, the at least one imperfect operating condition experienced or to be experienced by the transmitter may be caused by hardware impairment of the transmitter.

In an embodiment of the disclosure, the at least one imperfect operating condition experienced or to be experienced by the transmitter may comprise one or more of: phase noise; nonlinearity of a power amplifier; filter ripple; I/Q gain imbalance; and I/Q phase imbalance.

In an embodiment of the disclosure, the target constellation map may be determined by using a machine learning process.

In an embodiment of the disclosure, the target constellation map may be determined from a pre-defined set of constellation maps.

In an embodiment of the disclosure, the transmitter may be a base station and the receiver may be a terminal device. Alternatively, the transmitter may be a terminal device and the receiver may be a base station.

According to a fourth aspect of the disclosure, there is provided a transmitter. The transmitter may comprise at least one processor and at least one memory. The at least one memory may contain instructions executable by the at least one processor, whereby the transmitter may be operative to perform a first transmission to a receiver. The transmitter may be further operative to receive, from the receiver, first information related to one or more candidate constellation maps adapted to one or more current operating conditions, or second information usable for deriving the one or more candidate constellation maps. The transmitter may be further operative to determine a target constellation map based at least on the first information or the second information. The transmitter may be further operative to perform a second transmission to the receiver based on the determined target constellation map.

In an embodiment of the disclosure, the transmitter may be operative to perform the method according to the above first aspect.

According to a fifth aspect of the disclosure, there is provided a receiver. The receiver may comprise at least one processor and at least one memory. The at least one memory may contain instructions executable by the at least one processor, whereby the receiver may be operative to receive a first transmission from a transmitter. The receiver may be further operative to determine first information related to one or more candidate constellation maps adapted to one or more current operating conditions, or second information usable for deriving the one or more candidate constellation maps, based on the received first transmission. The receiver may be further operative to transmit the first information or the second information to the transmitter.

In an embodiment of the disclosure, the receiver may be operative to perform the method according to the above second aspect.

According to a sixth aspect of the disclosure, there is provided a transmitter. The transmitter may comprise at least one processor and at least one memory. The at least one memory may contain instructions executable by the at least one processor, whereby the transmitter may be operative to determine a target constellation map adapted to one or more operating conditions. The transmitter may be further operative to inform a receiver of the determined target constellation map. The transmitter may be further operative to perform a transmission to the receiver based on the determined target constellation map.

In an embodiment of the disclosure, the transmitter may be operative to perform the method according to the above third aspect.

According to a seventh aspect of the disclosure, there is provided a computer program product. The computer program product may comprise instructions which when executed by at least one processor, cause the at least one processor to perform the method according to any of the above first to third aspects.

According to an eighth aspect of the disclosure, there is provided a computer readable storage medium. The computer readable storage medium may store thereon instructions which when executed by at least one processor, cause the at least one processor to perform the method according to any of the above first to third aspects.

According to a ninth aspect of the disclosure, there is provided a transmitter. The transmitter may comprise a transmission module, a reception module and a determination module. The transmission module may be configured to perform a first transmission to a receiver. The reception module may be configured to receive, from the receiver, first information related to one or more candidate constellation maps adapted to one or more current operating conditions, or second information usable for deriving the one or more candidate constellation maps. The determination module may be configured to determine a target constellation map based at least on the first information or the second information. The transmission module may be further configured to perform a second transmission to the receiver based on the determined target constellation map.

In an embodiment of the disclosure, the determination module may be configured to determine the target constellation map based further on third information that is available at the transmitter.

In an embodiment of the disclosure, the transmitter may further comprise an informing module configured to inform the receiver of the target constellation map or fourth information usable for deriving the target constellation map.

In an embodiment of the disclosure, the transmitter may further comprise an activation module configured to activate the receiver to participate in adaptation of constellation map.

In an embodiment of the disclosure, the transmitter may further comprise a detection module configured to detect at least one imperfect operating condition experienced or to be experienced by the transmitter. The receiver may be activated by the activation module in response to the detecting of the at least one imperfect operating condition by the detection module.

In an embodiment of the disclosure, the reception module may be further configured to receive, from the receiver, capability information of the receiver about supporting of adaptation of constellation map.

According to a tenth aspect of the disclosure, there is provided a receiver. The receiver may comprise a reception module, a determination module and a transmission module. The reception module may be configured to receive a first transmission from a transmitter. The determination module may be configured to determine first information related to one or more candidate constellation maps adapted to one or more current operating conditions, or second information usable for deriving the one or more candidate constellation maps, based on the received first transmission. The transmission module may be configured to transmit the first information or the second information to the transmitter.

In an embodiment of the disclosure, the determination module may be configured to determine the first information related to one candidate constellation map adapted to one or more current operating conditions. The reception module may be further configured to receive a second transmission from the transmitter based on the one candidate constellation map.

In an embodiment of the disclosure, the determination module may be configured to determine the second information usable for deriving one or more candidate constellation maps. The determination module may be further configured to determine a target constellation map based on the second information. The reception module may be further configured to receive a second transmission from the transmitter based on the determined target constellation map.

In an embodiment of the disclosure, the reception module may be further configured to receive, from the transmitter, third information indicating a target constellation map. The reception module may be further configured to receive a second transmission from the transmitter based on the indicated target constellation map.

In an embodiment of the disclosure, the determination module may be configured to determine the second information usable for deriving one or more candidate constellation maps. The reception module may be further configured to receive, from the transmitter, fourth information usable for deriving a target constellation map. The determination module may be further configured to determine a target constellation map based on the fourth information. The reception module may be further configured to receive a second transmission from the transmitter based on the determined target constellation map.

In an embodiment of the disclosure, the reception module may be further configured to receive, from the transmitter, at least one signaling for activating the receiver to participate in adaptation of constellation map.

In an embodiment of the disclosure, the transmission module may be further configured to transmit, to the transmitter, capability information of the receiver about supporting of adaptation of constellation map.

According to an eleventh aspect of the disclosure, there is provided a transmitter. The transmitter may comprise a determination module, an informing module and a transmission module. The determination module may be configured to determine a target constellation map adapted to one or more operating conditions. The informing module may be configured to inform a receiver of the determined target constellation map. The transmission module may be configured to perform a transmission to the receiver based on the determined target constellation map.

In an embodiment of the disclosure, the transmitter may further comprise a detection module configured to detect at least one imperfect operating condition experienced or to be experienced by the transmitter. The target constellation map may be determined by the determination module in response to the detecting of the at least one imperfect operating condition by the detection module.

In an embodiment of the disclosure, the transmitter may further comprise a reception module configured to receive, from the receiver, capability information of the receiver about supporting of adaptation of constellation map.

According to a twelfth aspect of the disclosure, there is provided a method implemented in a communication system including a transmitter and a receiver. The method may comprise all steps of the methods according to the above first and second aspects.

According to a thirteenth aspect of the disclosure, there is provided a communication system. The communication system may comprise a transmitter according to the above fourth or ninth aspect and a receiver according to the above fifth or tenth aspect.

According to a fourteenth aspect of the disclosure, there is provided a method implemented in a communication system including a transmitter and a receiver. The method may comprise all steps of the method according to the above third aspect. The method may further comprise, at the receiver, receiving from the transmitter information indicating the target constellation map. The method may further comprise, at the receiver, receiving the transmission from the transmitter based on the target constellation map.

According to a fifteenth aspect of the disclosure, there is provided a communication system. The communication system may comprise a transmitter according to the above sixth or eleventh aspect and a receiver. The receiver may be configured to receive, from the transmitter, information indicating the target constellation map. The receiver may be further configured to receive the transmission from the transmitter based on the target constellation map.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

The modulation scheme can either be fixed, for example when the channel quality is known, or it can be dynamically adjusted based on the current radio conditions. The function that selects the modulation scheme is often referred to as link adaptation (LA) or link quality control (LQC). In e.g. new radio (NR), there are a set of predetermined modulation and coding schemes (MCSs) that the transmitter can chose from to try to optimize the link quality (e.g. throughput, delay, etc.). Table 2 below is Table 5.1.3.1-3 from 3rd generation partnership project (3GPP) technical specification (TS) 38.214 V16.6.0. It is an MCS index table for physical downlink shared channel (PDSCH). By using this table, the MCS index can be mapped to a preferred modulation scheme. The modulation schemes referred to by the modulation order (Qm) in Table 2 consist of the traditional modulation schemes QPSK, 16QAM and 64QAM. In NR, link adaptation for the downlink can be aided by channel state feedback that indirectly informs the transmitter about a preferred MCS, but can also be based on other types of feedback such as sounding reference symbols in the uplink.

TABLE 2

MCS index table for PDSCH

| MCS Index $I_{MCS}$ | Modulation Order $Q_m$ | Target code Rate R × [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

Figure 1:
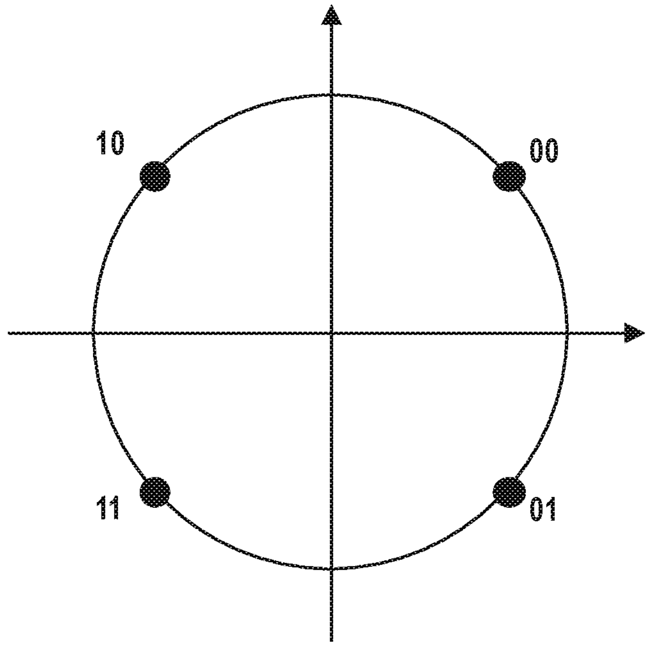
FIG. 1 is an I/Q diagram illustrating the constellation points of QPSK.
Figure 2:
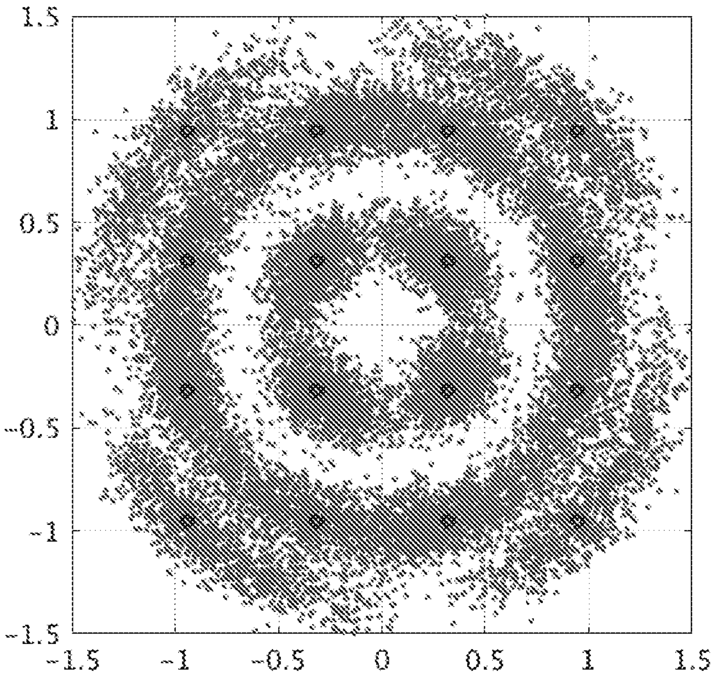
FIG. 2 is a diagram illustrating a problem with the existing solution.

The use of traditional modulation schemes is not suitable when operating in communication links where their distortion does not match the model (characteristics) assumed when the modulation scheme was designed. One example is shown in FIG. 2 where the received and demodulated symbols in uplink (UL) NR using discrete Fourier transform spread orthogonal frequency division multiplexing (DFT-s-OFDM) and 16QAM in presence of both AWGN and phase noise are plotted. The x-axis of FIG. 3 indicates the I values and the y-axis of FIG. 3 indicates the Q values. The phase noise causes a certain angular spread of the symbols. Hence, constellation points with larger amplitude will have a more pronounced noise. The 16QAM constellation has three distinct amplitude levels or concentric circles that the constellation points could be envisioned to lie on. In this example, the constellation points on the middle circle seem more error prone (the cloud of noisy symbols overlap more and hence are more difficult to distinguish). The four constellation points on the outermost circle seem most protected. Since symbols typically are transmitted with equal probability, it would be desirable for them to have an equal amount of protection against noise, which is not the case in this setting.

Phase noise is not the only problem. For example, with amplitude distortion (e.g. from filter ripple or power amplifier (PA) compression), there will be a radial spread of the constellation points.

The present disclosure proposes an improved solution for adaptation of communication parameter. The basic idea is to adapt the modulation scheme (the constellation map) used in the transmitter to the current operating conditions, specifically to imperfect operating conditions experienced at the transmitter and/or at the receiver. The term "constellation map" refers to a specific placement of a certain number (M) of symbols in the constellation diagram. The imperfect operating condition may be simply referred to as (e.g. hardware) imperfection and the two terms may be interchangeably used hereinafter. By adapting the transmitter behavior to fit the imperfections observed, link performance can be improved when exposed to such imperfections in the transmission and reception.

For example, the imperfection may be caused by hardware impairment of the transmitter and/or the receiver. Examples of the imperfection may include, but not limited to, phase noise (e.g. reception under severe phase noise), PA nonlinearity (e.g. PA compression at the transmitter), filter ripple, I/Q gain imbalance, I/Q phase imbalance, etc. Note that any of the above examples of the imperfection may occur at the transmitter and/or the receiver. As an exemplary example, such imperfections may be envisioned to be multiplicative and/or additive and/or nonlinear distortions that make the existing off-the-shelf modulation schemes (e.g. QAM modulation schemes) perform sub-optimally. In particular, under conditions with severe hardware impairments that otherwise for the existing system would not be possible to operate or to underperform, the solution of the present disclosure can allow the system to operate normally.

The term "modulation" can be used to represent a multitude of operations in a wireless transceiver chain. In the present disclosure, the modulation scheme refers to the set of constellation points in the I/Q plane that modulates all possible set of $\log_2(M)$ bits to a set of M complex symbols in the I/Q-plane. Although these symbols are then further typically modulated onto one or more transmit pulse shape (s) (e.g. using OFDM, or digital filter, such as root raised cosine (RRC) pulse) and the digital pulse shaped representation of the signal is further modulated onto a carrier waveform (e.g. radio frequency (RF) carrier frequency), these two latter meanings are not what is referred to in the present disclosure.

Currently used adaptations between modulation schemes (included as a part in what is usually referred to as e.g. LA or LQC mentioned above) imply an adaptation of modulation scheme (and typically also code rate) to improve link performance depending on the experienced radio quality. Although the present disclosure also adapts how the information is modulated, it does so in a different purpose by catering for different type of imperfections that can have (e.g. severe) negative impact on the performance.

As an option, such adaptation can be tailor-made to exactly fit the operating conditions. As another option, a quantized range of modulations can be foreseen to be defined to ease the implementation. By adapting to the imperfections using a limited set of pre-defined constellation maps, the degradation can be diminished, or possibly, completely removed. As an exemplary example, either or both of the optimization of the constellation maps and the optimization of the receiver/transmitter when operating under the imperfect operating conditions may be based on machine learning process.

The solution of the present disclosure can be a complement to, or a replacement of, similar functionality addressed by other existing solutions. As an example, phase tracking reference signal (PTRS) is included for example in the NR standard to allow the receiver to track and compensate for the phase noise at the receiver. A better phase tracking solution implies typically that a larger overhead from PTRS is required. In contrast, the solution of the present disclosure may provide no additional overhead in data transmission (e.g. PDSCH and/or physical uplink shared channel (PUSCH), if considering the physical data channels in NR). Thus, it may be a replacement of the PTRS solution. Alternatively, the solution of the present disclosure can be combined with the PTRS solution so that partial compensation of the phase noise imperfections comes from the PTRS and partial compensation comes from the solution of the present disclosure.

As another example, digital pre-distortion (DPD) of a PA is a module prior to the PA in the transmitter that distorts the digital signal fed into the PA with essentially the task of inverting the impact on the signal from the PA. Tuning of the DPD can be both costly and time consuming, and might not even be realizable at very high bandwidth transmissions since a sampling rate multiple times the bandwidth is typically required to ensure a linear signal after the PA. The solution of the present disclosure does not replace such DPD since it would not ensure a linear signal from the PA, but it could improve the in-band link performance by ensuring a more suitable modulation scheme when the PA is operating in compression. Hence, any residual distortion left from the DPD in the signal transmitted over-the-air can be adapted to by the solution of the present disclosure.

As still another example, power back-off has been used as a mechanism to adjust the operating point of a PA to the more linear regime. However, more linear operation of PA implies less energy efficient operation of PA. Through matching appropriate modulation to the impairment profile, the present disclosure can empower the communication system to tolerate more hardware impairments, thereby reducing the need for backing off transmit power and enabling more energy efficient operation of PA at the transmitter.

Figure 3:
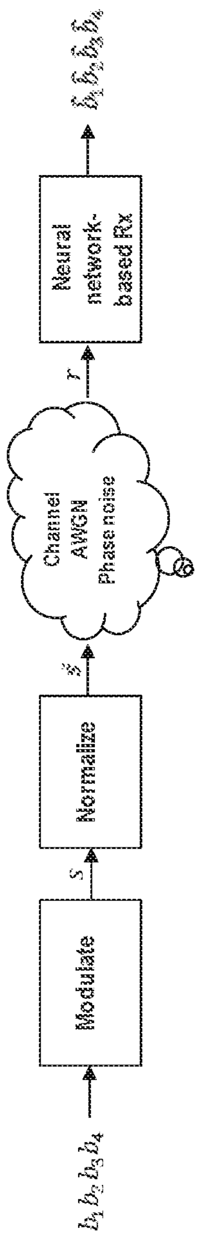
FIG. 3 is a diagram illustrating a simulation setup for verifying the effect of the disclosure.

To verify the possible performance benefit (or gain) from the present disclosure and provide a better understanding on the present disclosure, simulations have been carried out by the inventors using an artificial intelligence/machine learning (AI/ML) optimized constellation map based on the received and equalized symbols at the receiver. In the simulations, the imperfection applied to the transceiver chain was a phase noise source, where different levels of phase noise were multiplied with the received symbols. The phase noise was realized as a uniform angular noise with [±0, ±10, ±20] degrees in maximum angle. Three different simulations have been run (each with a separate setting of the phase noise), all at signal-to-noise ratio (SNR)=20 dB. The noise was only defined by AWGN, and was not defined by the phase noise component when defining the SNR. FIG. 3 is a high-level diagram illustrating the setup for the simulations, where the "Modulate" block and the "Neural network-based Rx" block are tunable parts. As shown, the transmit modulation (16 constellation points) was adapted by using a neural network based receiver that tries to predict whether or not a 0 or 1 was transmitted ($b_x$ is the x-th transmitted bit and $\hat{b}_x$ is the estimate of the same bit), based on the received symbols it sees. Hence, the transceiver was trained end-to-end with the optimizable modules (each with its associated parameters) of the modulation at the transmitter and the neural network at the receiver.

Figure 4:
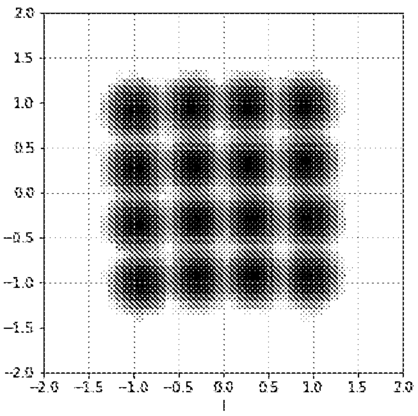
FIG. 4 is a diagram illustrating a result obtained by the simulation.
Figure 4:
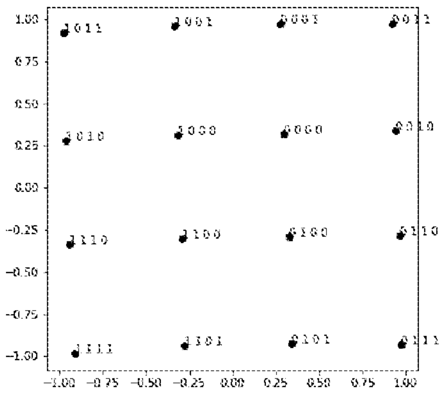
Figure 4:
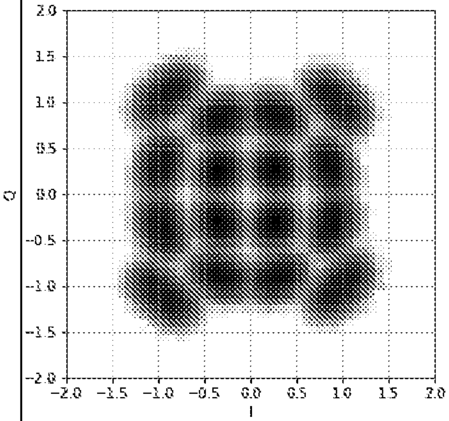
Figure 4:
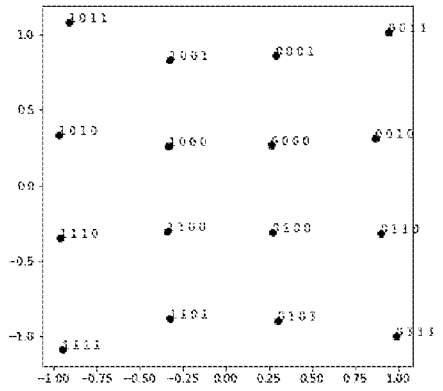
Figure 4:
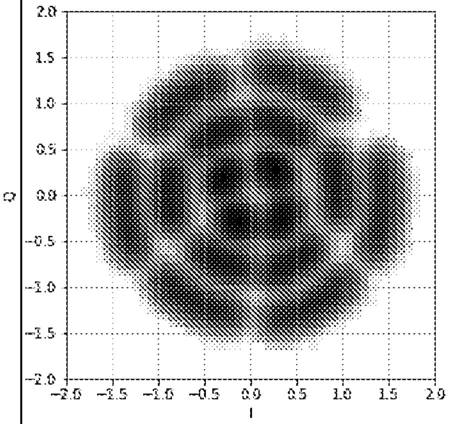
Figure 4:
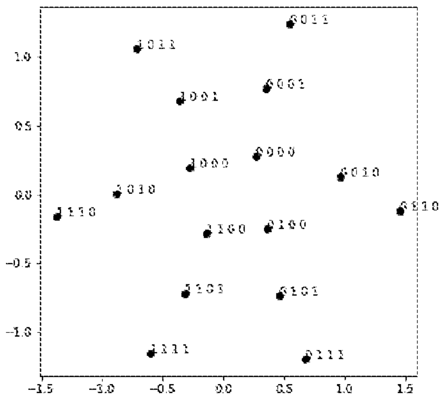

FIG. 4 illustrates the noisy received symbols and associated optimized constellation maps which were produced by the three trained models ([±0, ±10, ±20] degrees in maximum phase noise). Ocular inspection can already provide a good guess that the constellation map optimized for the condition it was experiencing would provide improvements, which could be also verified by the results shown in FIG. 5 described later. For example, with high phase noise, the constellation is more resembling a "star"-like pattern (see the lower right constellation map in FIG. 4), which would be expected by a multiplicative angular distortion (more spreading of the noise the further out you go from the origin).

Figure 5:
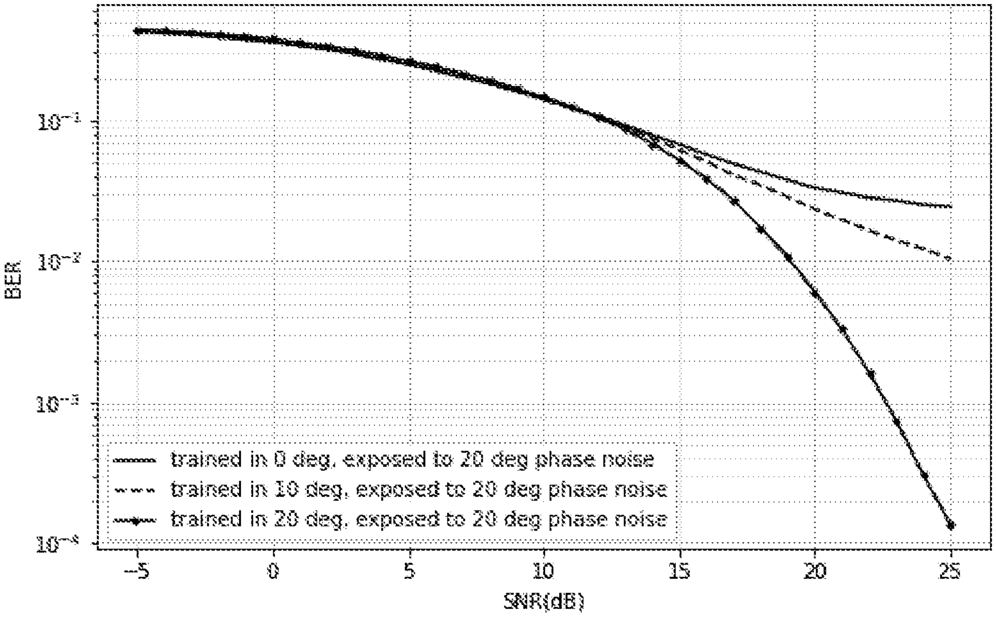
FIG. 5 is a diagram illustrating a result obtained by the simulation.
Figure 6A:
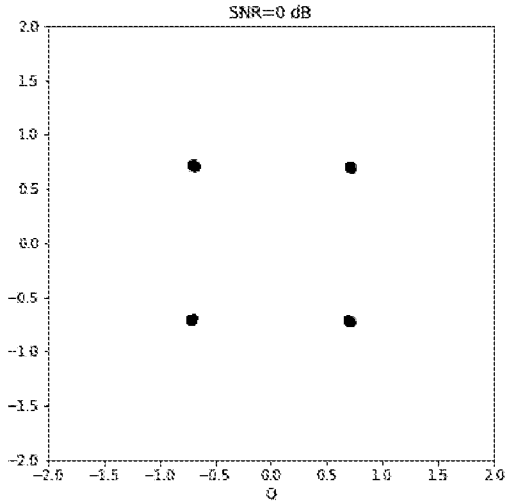
FIGS. 6A-6D are diagrams illustrating a result obtained by the simulation.
Figure 6B:
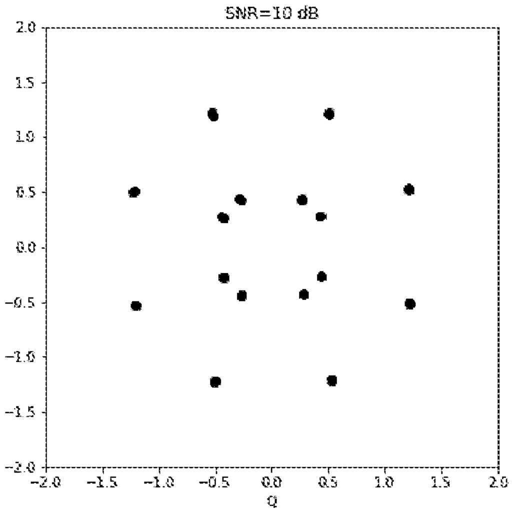
Figure 6C:
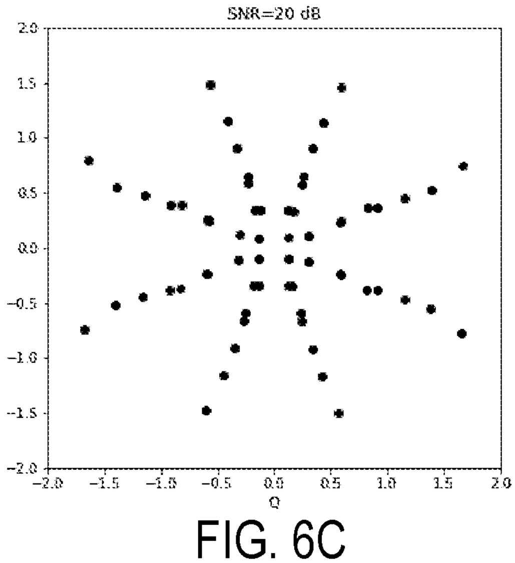
Figure 6D:
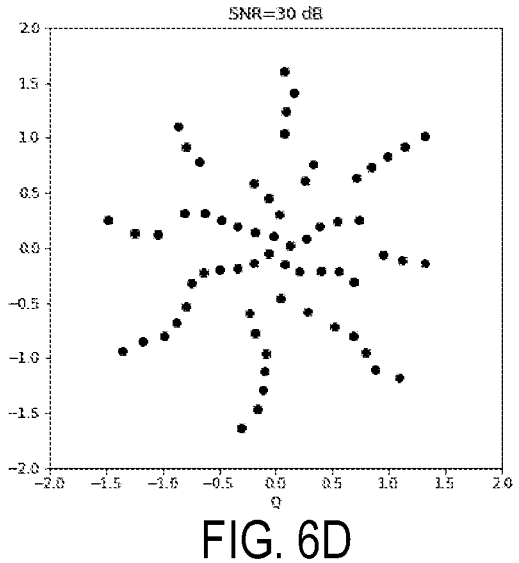

For each of the three trained models, the raw bit error rate (BER) performance was investigated over a range of SNR values assuming an experienced angular phase noise of maximum 20 degrees for all models. FIG. 5 shows the results for the models trained under different circumstances but all exposed to 20 degrees phase noise. As expected, the constellation map optimized when experiencing an angular phase noise of maximum 20 degrees, also performed best out of the three models, showing the potential of the present disclosure. Note that further gains could possibly be observed if looking at decoded BER or block error ratio (BLER) where the soft bit quality would come into play (not just the sign of the bits but how certain the receiver determined that a 0 or a 1 was transmitted).

Another example of optimized constellation maps is shown in FIGS. 6A-6D, where a constellation map of size 64 was trained at different SNRs (noise being defined by thermal noise), all experiencing 20 degree artificial phase noise. As can be seen, at a low SNR (=0 dB), the 64 points were grouped into a set of four effective points, resembling QPSK constellation. This is because the performance was limited by thermal noise in this regime. Moving to SNR=10 dB, the 64 points were grouped into 16 groups where both a thermal noise component (a clear distance in radial direction between points with similar angular direction) and a phase noise component (a wider spread of constellation points in the angular direction the farther from the origin the points lie). At a higher SNR, the phase noise was the limiting noise factor.

It should be noted that the constellation diagrams shown in FIG. 4 and FIGS. 6A-6D were not optimum for the operating conditions and were the results of a short training run (in the order of a few minutes) on a local laptop. For example, a more evident symmetry in all constellations would be expected with a more optimized constellation. Optionally, additional constraints could be included when designing constellations, e.g. complexity of mapping and de-mapping (slicing). As an exemplary example, a selected constellation map may be based on a subset of points from a higher-order constellation map, removing points that are most susceptible to the current operating conditions.

The solution of the present disclosure may be applied to a communication system including a terminal device and a base station. The terminal device can communicate through a radio access communication link with the base station. The base station can provide radio access communication links to terminal devices that are within its communication service cell. Note that the communications may be performed between the terminal device and the base station according to any suitable communication standards and protocols.

The term "base station (BS)" may refer to, for example, a node B (NodeB or NB), an evolved Node B (eNodeB or eNB), a next generation Node B (gNodeB or gNB), a remote radio unit (RRU), a radio header (RH), a remote radio head (RRH), a relay, a low power node such as a femto, a pico, and so forth. For example, a base station may comprise a central unit (CU) including CU user plane (UP) and CU control plane (CP) and one or more distributed units (DUs). The CU and DU(s) may co-locate in a same network node, e.g. a same base station. Thus, when one of the transmitter and the receiver described later is a base station, it may be implemented either as a network element on a dedicated hardware, as a software instance running on a dedicated hardware, or as a virtualized function instantiated on an appropriate platform, e.g. on a cloud infrastructure.

The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Hereinafter, the solution of the present disclosure will be described in detail with reference to FIGS. 7-37.

Figure 7:
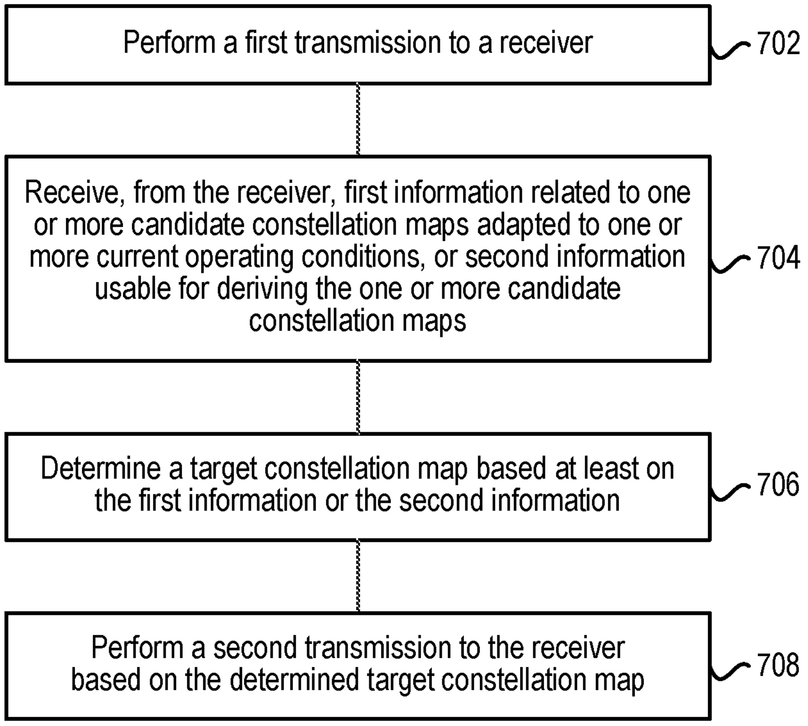
FIG. 7 is a flowchart illustrating a method performed by a transmitter according to an embodiment of the disclosure.

FIG. 7 is a flowchart illustrating a method performed by a transmitter according to an embodiment of the disclosure. At block 702, the transmitter performs a first transmission to a receiver. Although a base station will be taken as an example for describing the transmitter and a terminal device will be taken as an example for describing the receiver, it is also possible that the transmitter is a terminal device and the receiver is a base station. The first transmission may be performed based on a first constellation map. The first constellation map may be indicated by the transmitter to the receiver, or may be pre-defined between the transmitter and the receiver.

As a first option, a pre-defined signal may be transmitted in the first transmission. For this option, there is no need for the transmitter to indicate the first constellation map to the receiver. For example, a PRS may be used as the pre-defined signal. The PRS may be designed to "probe" the radio link for imperfection(s), e.g. spanning a wide range of amplitudes to force the PA in the transmitter to enter compression. During the transmission of the PRS, different constellation maps may be transmitted to the receiver within a probing period in pre-configured/known resources to assist the receiver in adaptation of constellation map, which will be described later. As a second option, modulated data (or payload) may be transmitted in the first transmission. For this option, the first constellation map may be indicated to the receiver so that the same constellation map may be used for the transmission by the transmitter and the reception by the receiver. As a third option, both the pre-defined signal and the modulated data may be transmitted in the first transmission.

At block 704, the transmitter receives, from the receiver, first information related to one or more candidate constellation maps adapted to one or more current operating conditions, or second information usable for deriving the one or more candidate constellation maps. The one or more current operating conditions may comprise at least one imperfect operating condition experienced by the receiver and/or the transmitter. For example, the at least one imperfect operating condition experienced by the receiver and/or the transmitter may be caused by hardware impairment of the receiver and/or the transmitter. Examples of the at least one imperfect operating condition may include, but not limited to, phase noise, nonlinearity of a power amplifier, filter ripple, I/Q gain imbalance, I/Q phase imbalance, etc.

The first information may indicate the one or more candidate constellation maps. In a case where the number of the one or more candidate constellation maps is more than one, the more than one candidate constellation map may optionally comprise, for each of a plurality of transmission configurations of the transmitter, a set of candidate constellation map(s). Optionally, the first information may further indicate, for each of the one or more candidate constellation maps, a degree of adaptation of the candidate constellation map to the one or more current operating conditions.

The second information may comprise information related to the one or more current operating conditions. The second information may be obtained by the receiver from the received first transmission. For example, the second information may comprise information related to the at least one imperfect operating condition experienced by the receiver and/or the transmitter. As a first option, the second information may comprise one or more parameters (e.g. phase noise power level, PA nonlinearity level, etc.) characterizing the at least one imperfect operating condition. For example, a neural network may be used to infer such parameters from the received signal in the first transmission. As a second option, the second information may comprise an indicator indicating a type of the at least one imperfect operating condition. For example, a neural network may be used to classify the received signal into a corresponding class of imperfect operating condition. Note that any other suitable machine learning process besides neural network may be used instead.

The one or more candidate constellation maps and optionally degrees of adaptation thereof may be determined by the receiver with any of the following options. As the first option, in the case where a PRS is transmitted to the receiver, the receiver may use a metric to compare the different constellation maps transmitted within the probing period, and determine at least one constellation map with the best performance as the one or more candidate constellation maps. The degrees of adaptation thereof may be determined based on the values of the metric. Examples of the metric may include, but not limited to, symbol error rate (SER), coded or uncoded BER, BLER, soft bit magnitude, mutual information, or a metric based on the raw signal received, given the knowledge of the transmitted constellation map (similar to traditional error vector magnitude (EVM) measurements).

As the second option, experiments or simulations may be performed under different imperfect operating conditions (represented by e.g. the second information described above) to determine corresponding optimized constellation maps so that a table indicating the correspondence therebetween may be predetermined. Then, from the optimized constellation maps in the table, at least one constellation map whose imperfect operating condition is similar to the current imperfect operating condition observed may be determined as the one or more candidate constellation maps. The degrees of adaptation thereof may be determined based on the similarity between the compared imperfect operating conditions.

As the third option, a neural network may be used to train a model from a plurality of samples each of which may include the second information described above and corresponding optimized constellation maps. Then, the trained model may be used to classify the second information related to the current imperfect operating condition. At least one optimized constellation map corresponding to the class having the largest classifier output may be determined as the one or more candidate constellation maps. A softmax layer may be added as the final layer of the neural network to output the corresponding probabilities as the degrees of adaptation. Note that any other suitable machine learning process besides neural network may be used instead.

At block 706, the transmitter determines a target constellation map based at least on the first information or the second information. In the case of the determination based on the first information, if the first information only indicates one candidate constellation map, the one candidate constellation map may be determined as the target constellation map. If the first information indicates more than one candidate constellation map, a pre-defined one (e.g. the first one) of the more than one candidate constellation map may be determined as the target constellation map. As a result, there is no need for the transmitter to indicate it back to the receiver. In the case of the determination based on the second information, a predetermined table or a trained model which is the same as that at the receiver described above may be used by the transmitter so that the transmitter and the receiver may determine a same constellation map as the target constellation map. Thus, in either of the above two cases, one of the one or more candidate constellation maps is determined as the target constellation map.

At block 708, the transmitter performs a second transmission to the receiver based on the determined target constellation map. With the method of FIG. 7, the constellation map used by the transmitter can be more suitable for the one or more current operating conditions thereby improving link performance. Optionally, blocks 702-708 may be performed iteratively. For example, suppose the above description with respect to these blocks refers to the first iteration. Then, the second transmission performed at block 708 in the first iteration may be deemed as the first transmission performed at block 702 in the second iteration. Then, blocks 704-708 may be performed for the second iteration.

Figure 8:
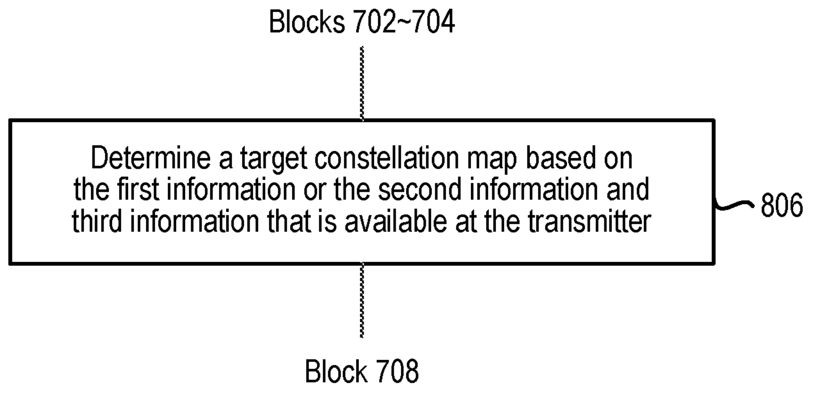
FIG. 8 is a flowchart illustrating a method performed by a transmitter according to an embodiment of the disclosure.

FIG. 8 is a flowchart illustrating a method performed by a transmitter according to an embodiment of the disclosure. As shown, the method comprises blocks 702-704 of FIG. 7, block 806 and block 708 of FIG. 7. Thus, only the difference (block 806) between the methods of FIG. 7 and FIG. 8 will be described below. At block 806, the transmitter determines the target constellation map based on the first information or the second information and third information that is available at the transmitter. For example, the third information may comprise, but not limited to, one or more of: at least one imperfect operating condition experienced by the transmitter; information about an upcoming transmission to be performed by the transmitter; information about available constellation maps supported by the transmitter; or the like. The information about the upcoming transmission may comprise, but not limited to, at least one imperfect operating condition to be experienced by the transmitter, an objective to be achieved by the transmitter for the uplink transmission, or the like. For example, the at least one imperfect operating condition experienced or to be experienced by the transmitter may be caused by hardware impairment of the transmitter. Examples of the at least one imperfect operating condition may include, but not limited to, phase noise, nonlinearity of a power amplifier, filter ripple, I/Q gain imbalance, I/Q phase imbalance, etc.

Since the third information may be unknown to the receiver, a different constellation map than the one or more candidate constellation maps, or one of the one or more candidate constellation maps may be determined as the target constellation map. As an example, in the case where the at least one imperfect operating condition included in the third information is different from that included in the second information, a union set of the second information and the third information may be used as an input to the predetermined table or the trained model described above at the transmitter to determine the target constellation map. As another example, if the objective to be achieved by the transmitter for the uplink transmission is different from the objective of the receiver (e.g. optimizing the above metric such as SER, coded or uncoded BER, BLER, soft bit magnitude, mutual information, or EVM-like measurements), one of the one or more candidate constellation maps that facilitates both objectives may be determined as the target constellation map. As still another example, if only one constellation map recommended by the receiver is not supported by the transmitter, the transmitter may determine, as the target constellation map, a different constellation map than this one constellation map. With the method of FIG. 8, the constellation map used by the transmitter can be more suitable for the one or more current operating conditions thereby improving link performance.

Figure 9:
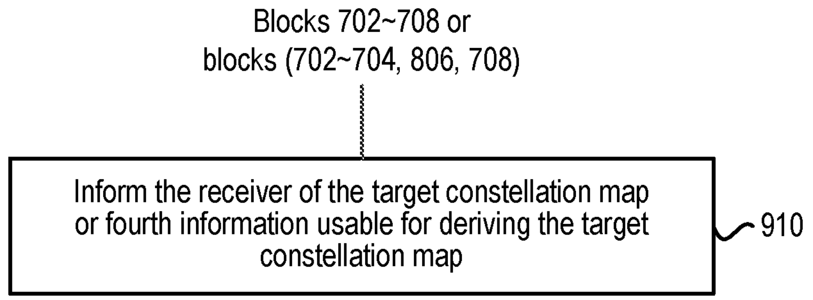
FIG. 9 is a flowchart illustrating a method performed by a transmitter according to an embodiment of the disclosure.

FIG. 9 is a flowchart illustrating a method performed by a transmitter according to an embodiment of the disclosure. As shown, the method comprises: blocks of FIG. 7 or FIG. 8; and block 910. Thus, only the difference (block 910) between the methods of FIG. 7 or 8 and FIG. 9 will be described below. At block 910, the transmitter informs the receiver of the target constellation map or fourth information usable for deriving the target constellation map. The target constellation map or the fourth information may be informed by a signaling. In the case where the target constellation map is informed, the same constellation map may also be used by the receiver for demodulation. The fourth information may be determined based on the second information and the third information. For example, in the case where the second information is an index indicating the corresponding class of imperfect operating condition, the target constellation map may be determined by considering both the second information and the third information. Then, the fourth information may be determined as an index corresponding to the determined target constellation map. In the case where the fourth information is informed, the fourth information may be input to the above predetermined table or the above trained model at the receiver to determine the same target constellation map.

Figure 10:
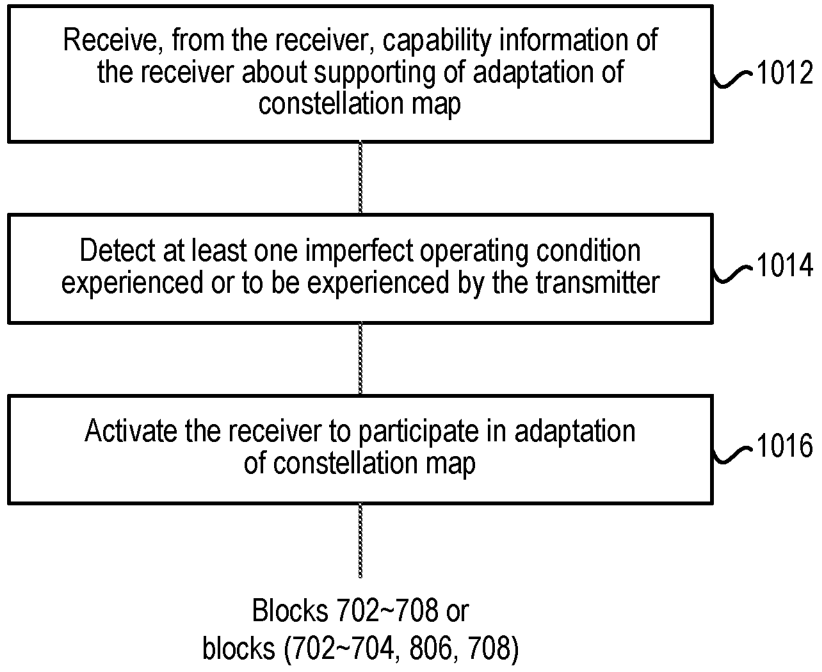
FIG. 10 is a flowchart illustrating a method performed by a transmitter according to an embodiment of the disclosure.

FIG. 10 is a flowchart illustrating a method performed by a transmitter according to an embodiment of the disclosure. As shown, the method comprises blocks 1012-1016 and blocks of FIG. 7 or 8. At block 1012, the transmitter receives, from the receiver, capability information of the receiver about supporting of adaptation of constellation map. For example, the capability information may indicate whether or not the receiver supports adaptation of constellation map and which constellation maps are supported by the receiver. In this way, the transmitter can decide whether or not to use the novel functionality of adaptation of constellation map with the receiver. Since the novel functionality may be supported by all transmitters and receivers in a certain area, block 1012 may be omitted and thus is an optional block.

At block 1014, the transmitter detects at least one imperfect operating condition experienced or to be experienced by the transmitter. For example, the at least one imperfect operating condition experienced or to be experienced by the transmitter may be caused by hardware impairment of the transmitter. Examples of the at least one imperfect operating condition may include, but not limited to, phase noise, nonlinearity of a power amplifier, filter ripple, I/Q gain imbalance, I/Q phase imbalance, etc.

Figure 11:
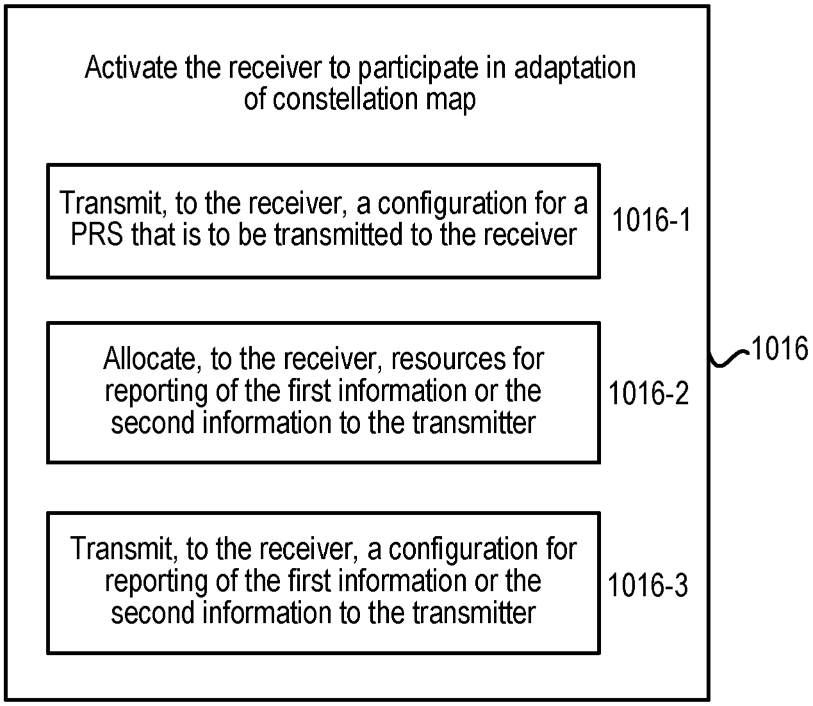
FIG. 11 is a flowchart for explaining the method of FIG. 10.

At block 1016, the transmitter activates the receiver to participate in adaptation of constellation map. For example, the receiver may be activated in response to the detecting of the at least one imperfect operating condition. As shown in FIG. 11, the activation may include, but not limited to, one or more of: transmitting, to the receiver, a configuration for a PRS that is to be transmitted to the receiver (block 1016-1); allocating, to the receiver, resources for reporting of the first information or the second information to the transmitter (block 1016-2); and transmitting, to the receiver, a configuration for reporting of the first information or the second information to the transmitter (block 1016-3). Since the blocks of FIG. 7 or FIG. 8 may be always performed periodically, blocks 1014 and 1016 may be omitted and thus are optional blocks.

Figure 12:
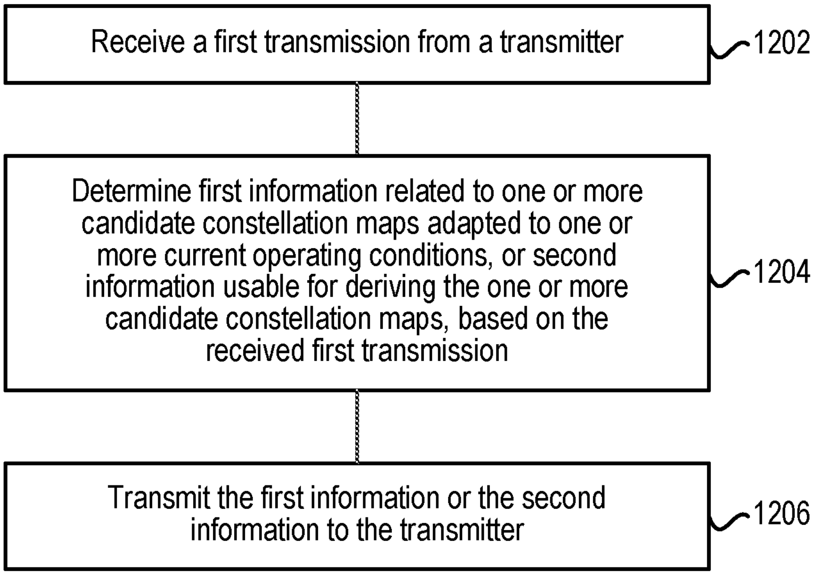
FIG. 12 is a flowchart illustrating a method performed by a receiver according to an embodiment of the disclosure.

FIG. 12 is a flowchart illustrating a method performed by a receiver according to an embodiment of the disclosure. At block 1202, the receiver receives a first transmission from a transmitter. Block 1202 corresponds to block 702 and its details are omitted here for brevity. At block 1204, the receiver determines first information related to one or more candidate constellation maps adapted to one or more current operating conditions, or second information usable for deriving the one or more candidate constellation maps, based on the received first transmission. Details of the determination at block 1204 have been described with reference to block 704 and thus are omitted here. At block 1206, the receiver transmits the first information or the second information to the transmitter. With the method of FIG. 12, it is possible to allow the transmitter to use a constellation map more suitable for the one or more current operating conditions thereby improving link performance.

Figure 13:
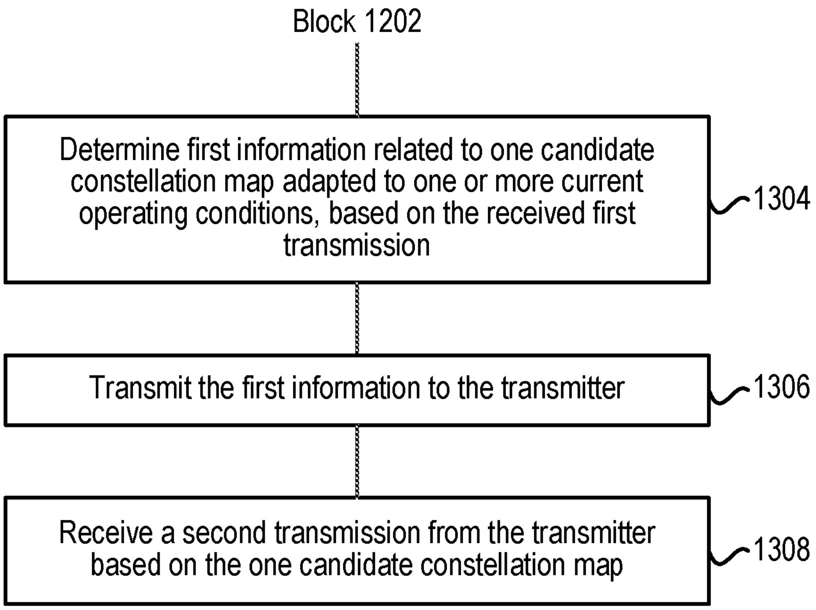
FIG. 13 is a flowchart illustrating a method performed by a receiver according to an embodiment of the disclosure.

FIG. 13 is a flowchart illustrating a method performed by a receiver according to an embodiment of the disclosure. As shown, the method comprises block 1202 of FIG. 12 and blocks 1304-1308. At block 1202, the receiver receives a first transmission from a transmitter. At block 1304, the receiver determines the first information related to one candidate constellation map adapted to one or more current operating conditions. For example, in the first option for the determination described above with respect to block 704, the constellation map with the best performance may be determined as the one candidate constellation map. In the second option for the determination described above with respect to block 704, the constellation map whose imperfect operating condition is the most similar to the current imperfect operating condition observed may be determined as the one candidate constellation map. In the third option for the determination described above with respect to block 704, the optimized constellation map corresponding to the class having the largest classifier output may be determined as the one candidate constellation map. At block 1306, the receiver transmits the first information to the transmitter. At block 1308, the receiver receives a second transmission from the transmitter based on the one candidate constellation map. Thus, the one candidate constellation map recommended by the receiver can be also used by the transmitter for modulation. With the method of FIG. 13, the constellation map used by the receiver can be more suitable for the one or more current operating conditions thereby improving link performance.

Figure 14:
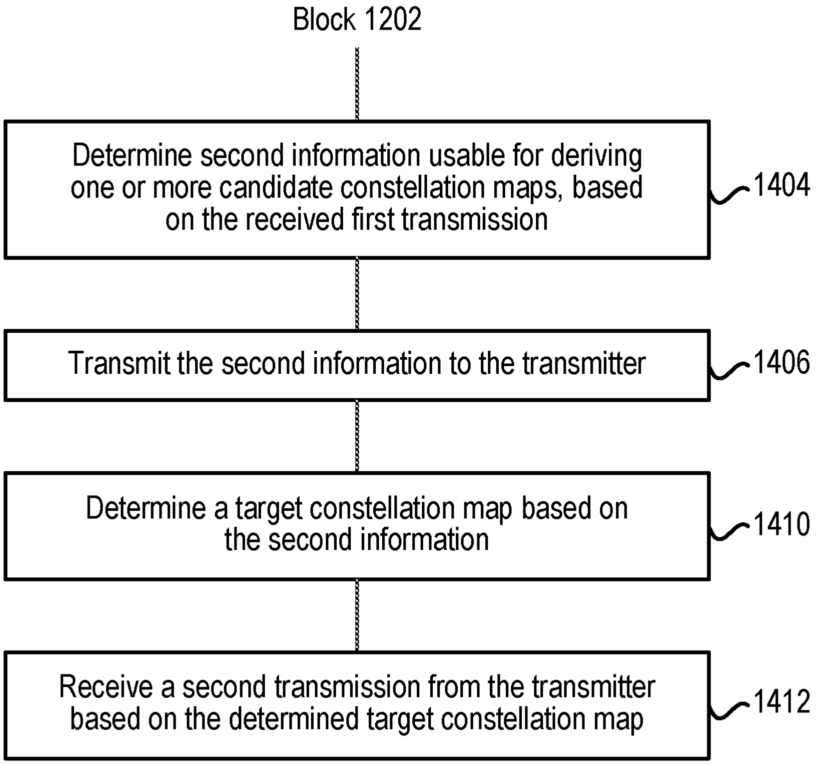
FIG. 14 is a flowchart illustrating a method performed by a receiver according to an embodiment of the disclosure.

FIG. 14 is a flowchart illustrating a method performed by a receiver according to an embodiment of the disclosure. As shown, the method comprises block 1202 of FIG. 12, and blocks 1404, 1406, 1410 and 1412. At block 1202, the receiver receives a first transmission from a transmitter. At block 1404, the receiver determines the second information usable for deriving one or more candidate constellation maps. The details about the second information and how to determine it have been described above with respect to block 704 and thus are omitted here. At block 1406, the receiver transmits the second information to the transmitter. At block 1410, the receiver determines a target constellation map based on the second information. For example, the same predetermined table or the same trained model may be used by the receiver and the transmitter to determine a same constellation map as the target constellation map. At block 1412, the receiver receives a second transmission from the transmitter based on the determined target constellation map. With the method of FIG. 14, the constellation map used by the receiver can be more suitable for the one or more current operating conditions thereby improving link performance.

Figure 15:
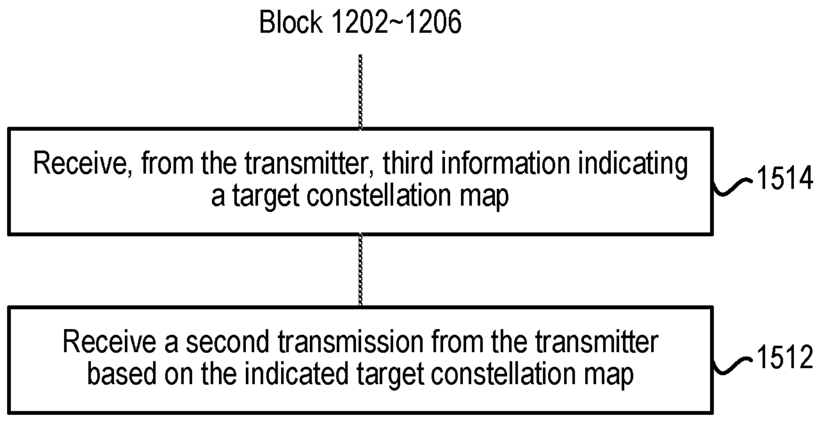
FIG. 15 is a flowchart illustrating a method performed by a receiver according to an embodiment of the disclosure.

FIG. 15 is a flowchart illustrating a method performed by a receiver according to an embodiment of the disclosure. As shown, the method comprises blocks 1202-1206 of FIG. 12, and blocks 1514 and 1512. Thus, only the difference (blocks 1514 and 1512) between the methods of FIG. 12 and FIG. 15 will be described below. At block 1514, the receiver receives, from the transmitter, third information indicating a target constellation map. The third information may be received by a signaling. At block 1512, the receiver receives the second transmission from the transmitter based on the indicated target constellation map. With the method of FIG. 15, the constellation map used by the receiver can be more suitable for the one or more current operating conditions thereby improving link performance.

Figure 16:
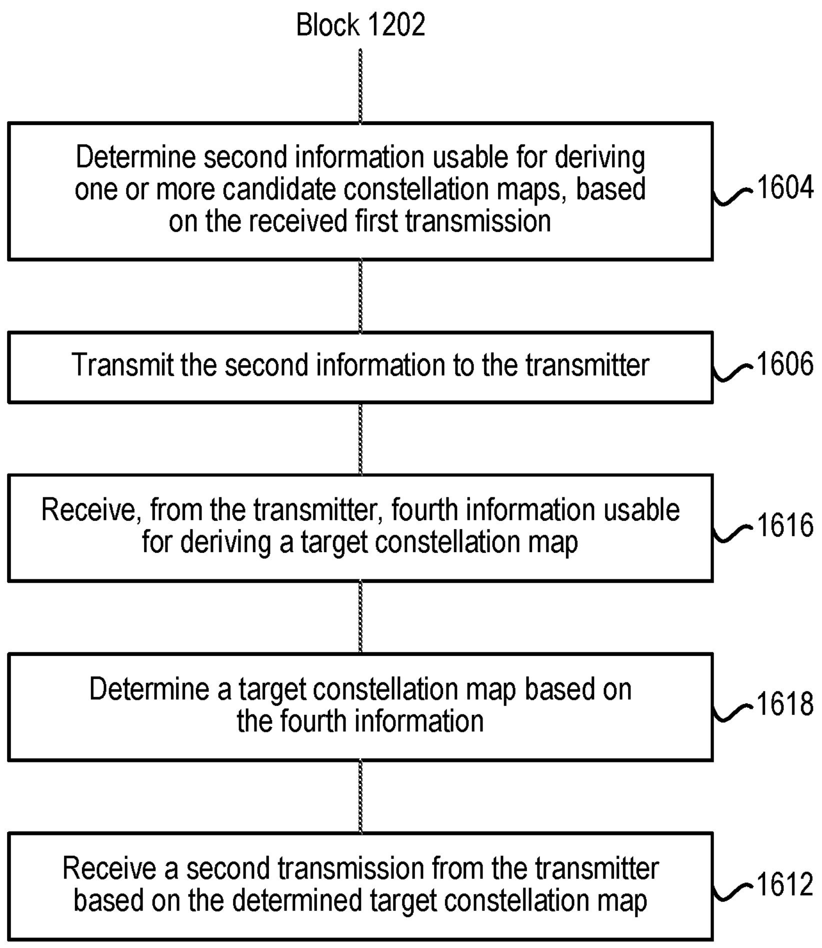
FIG. 16 is a flowchart illustrating a method performed by a receiver according to an embodiment of the disclosure.

FIG. 16 is a flowchart illustrating a method performed by a receiver according to an embodiment of the disclosure. As shown, the method comprises block 1202 of FIG. 12, and blocks 1604, 1606, 1616, 1618 and 1612. At block 1202, the receiver receives a first transmission from a transmitter. At block 1604, the receiver determines the second information usable for deriving one or more candidate constellation maps. The details about the second information and how to determine it have been described above with respect to block 704 and thus are omitted here. At block 1606, the receiver receives, from the transmitter, fourth information usable for deriving a target constellation map. The fourth information may be received by a signaling. The fourth information may be determined based on the second information and the third information. At block 1618, the receiver determines a target constellation map based on the fourth information. For example, the fourth information may be input to the above predetermined table or the above trained model at the receiver to determine the target constellation map. The same input information and the same determined table or trained model may be used by the transmitter to determine the same target constellation map. At block 1612, the receiver receives the second transmission from the transmitter based on the determined target constellation map. With the method of FIG. 16, the constellation map used by the receiver can be more suitable for the one or more current operating conditions thereby improving link performance.

Figure 17:
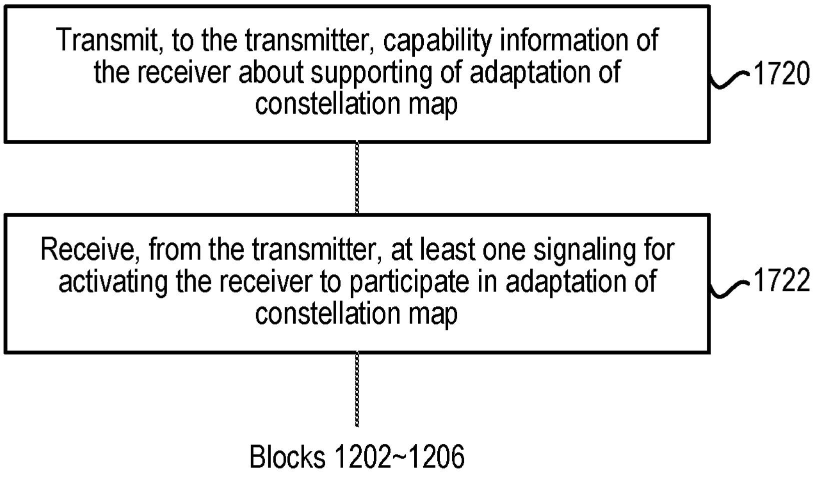
FIG. 17 is a flowchart illustrating a method performed by a receiver according to an embodiment of the disclosure.

FIG. 17 is a flowchart illustrating a method performed by a receiver according to an embodiment of the disclosure. As shown, the method comprises blocks 1720-1722 and blocks 1202-1206 of FIG. 12. Thus, only the difference (blocks 1720-1722) between the methods of FIG. 12 and FIG. 17 will be described below. At block 1720, the receiver transmits, to the transmitter, capability information of the receiver about supporting of adaptation of constellation map. For example, the capability information may indicate whether or not the receiver supports adaptation of constellation map and which constellation maps are supported by the receiver. In this way, the transmitter can be allowed to decide whether or not to use the novel functionality of adaptation of constellation map with the receiver. Since the novel functionality may be supported by all transmitters and receivers in a certain area, block 1720 may be omitted and thus is an optional block.

At block 1722, the receiver receives, from the transmitter, at least one signaling for activating the receiver to participate in adaptation of constellation map. The at least one signaling may comprise, but not limited to, one or more of: a configuration for a PRS that is to be transmitted to the receiver; a signaling for allocating, to the receiver, resources for reporting of the first information or the second information to the transmitter; and a configuration for reporting of the first information or the second information to the transmitter. Since blocks 1202-1206 of FIG. 12 may be always performed periodically, block 1722 may be omitted and thus is an optional block.

Figure 18:
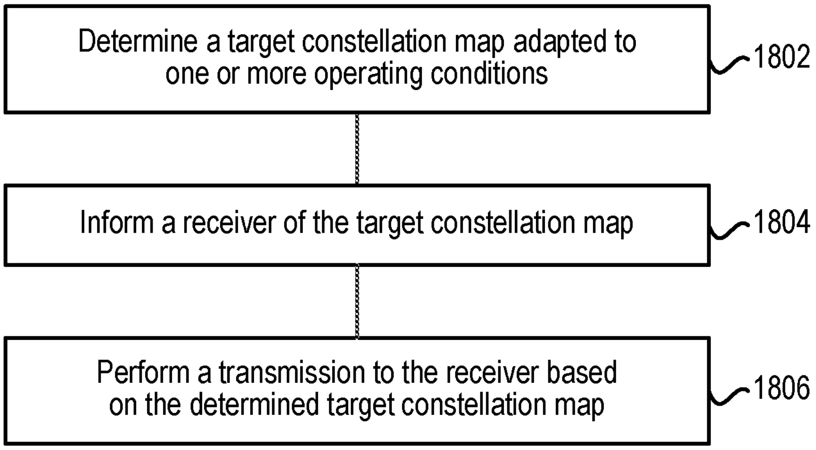
FIG. 18 is a flowchart illustrating a method performed by a transmitter according to an embodiment of the disclosure.

FIG. 18 is a flowchart illustrating a method performed by a transmitter according to an embodiment of the disclosure. At block 1802, the transmitter determines a target constellation map adapted to one or more operating conditions. The one or more operating conditions may comprise at least one imperfect operating condition experienced or to be experienced by the transmitter. For example, the at least one imperfect operating condition experienced or to be experienced by the transmitter may be caused by hardware impairment of the transmitter. Examples of the at least one imperfect operating condition may include, but not limited to, phase noise, nonlinearity of a power amplifier, filter ripple, I/Q gain imbalance, I/Q phase imbalance, etc. The target constellation map may be determined by using the above predetermined table or the above trained model as described above. Optionally, the target constellation map may be determined based further on information about an upcoming transmission (e.g. an objective to be achieved by the transmitter for the uplink transmission).

At block 1804, the transmitter informs a receiver of the determined target constellation map. For example, the target constellation map may be informed by a signaling. At block 1806, the transmitter performs the transmission to the receiver based on the determined target constellation map. With the method of FIG. 18, the constellation map used by the transmitter can be more suitable for the one or more operating conditions thereby improving link performance.

Figure 19:
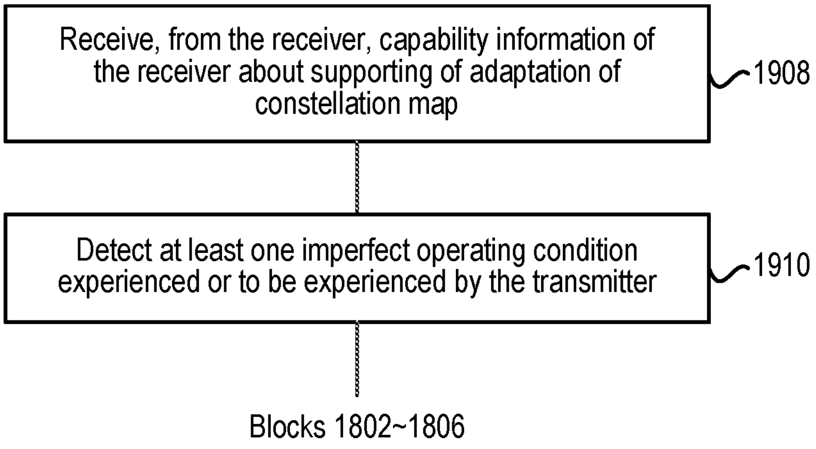
FIG. 19 is a flowchart illustrating a method performed by a transmitter according to an embodiment of the disclosure.

FIG. 19 is a flowchart illustrating a method performed by a transmitter according to an embodiment of the disclosure. As shown, the method comprises blocks 1908-1910 and blocks 1802-1806 of FIG. 18. Thus, only the difference (blocks 1908-1910) between the methods of FIG. 18 and FIG. 19 will be described below. At block 1908, the transmitter receives, from the receiver, capability information of the receiver about supporting of adaptation of constellation map. Block 1908 is the same as block 1012 and its details are omitted here. At block 1910, the transmitter detects at least one imperfect operating condition experienced or to be experienced by the transmitter. For example, block 1802 may be performed in response to the detecting of the at least one imperfect operating condition. Since blocks 1802-1806 may be always performed periodically, block 1910 may be omitted and thus is an optional block.

Figure 20:
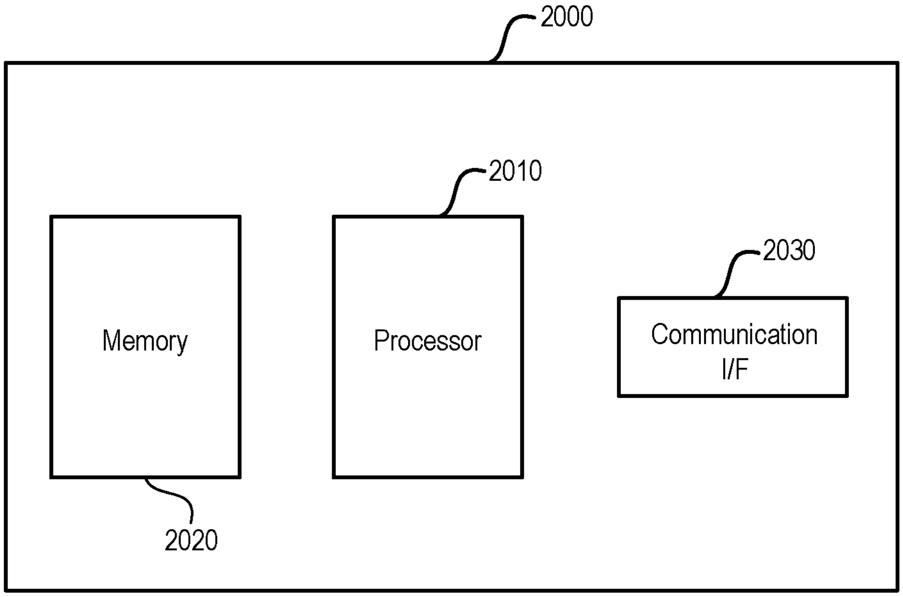
FIG. 20 is a block diagram showing an apparatus suitable for use in practicing some embodiments of the disclosure.

FIG. 20 is a block diagram showing an apparatus suitable for use in practicing some embodiments of the disclosure. For example, any one of the transmitter and the receiver described above may be implemented through the apparatus 2000. As shown, the apparatus 2000 may include a processor 2010, a memory 2020 that stores a program, and optionally a communication interface 2030 for communicating data with other external devices through wired and/or wireless communication.

The program includes program instructions that, when executed by the processor 2010, enable the apparatus 2000 to operate in accordance with the embodiments of the present disclosure, as discussed above. That is, the embodiments of the present disclosure may be implemented at least in part by computer software executable by the processor 2010, or by hardware, or by a combination of software and hardware.

The memory 2020 may be of any type suitable to the local technical environment and may be implemented using any suitable data storage technology, such as semiconductor based memory devices, flash memories, magnetic memory devices and systems, optical memory devices and systems, fixed memories and removable memories. The processor 2010 may be of any type suitable to the local technical environment, and may include one or more of general purpose computers, special purpose computers, microprocessors, digital signal processors (DSPs) and processors based on multi-core processor architectures, as non-limiting examples.

Figure 21:
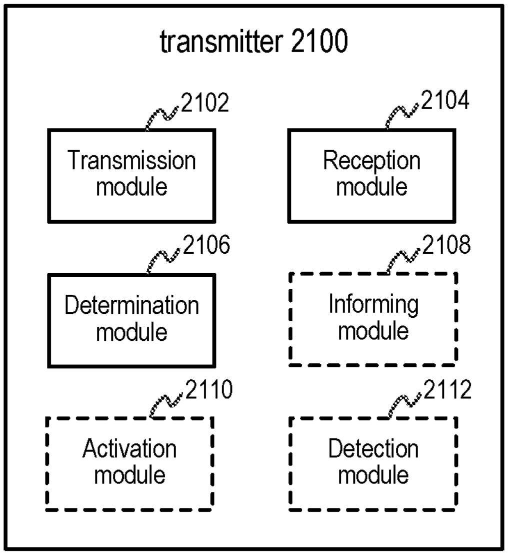
FIG. 21 is a block diagram showing a transmitter according to an embodiment of the disclosure.

FIG. 21 is a block diagram showing a transmitter according to an embodiment of the disclosure. As shown, the transmitter 2100 comprises a transmission module 2102, a reception module 2104 and a determination module 2106. The transmission module 2102 may be configured to perform a first transmission to a receiver. The reception module 2104 may be configured to receive, from the receiver, first information related to one or more candidate constellation maps adapted to one or more current operating conditions, or second information usable for deriving the one or more candidate constellation maps. The determination module 2106 may be configured to determine a target constellation map based at least on the first information or the second information. The transmission module 2102 may be further configured to perform a second transmission to the receiver based on the determined target constellation map.

Optionally, the determination module 2106 may be configured to determine the target constellation map based further on third information that is available at the transmitter. Optionally, the transmitter 2100 may further comprise an informing module 2108 configured to inform the receiver of the target constellation map or fourth information usable for deriving the target constellation map. Optionally, the transmitter 2100 may further comprise an activation module 2110 configured to activate the receiver to participate in adaptation of constellation map. Optionally, the transmitter 2100 may further comprise a detection module 2112 configured to detect at least one imperfect operating condition experienced or to be experienced by the transmitter. The receiver may be activated by the activation module 2110 in response to the detecting of the at least one imperfect operating condition by the detection module 2112. Optionally, the reception module 2104 may be further configured to receive, from the receiver, capability information of the receiver about supporting of adaptation of constellation map.

Figure 22:
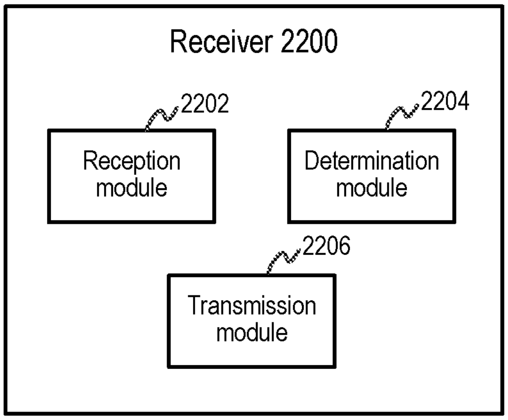
FIG. 22 is a block diagram showing a receiver according to an embodiment of the disclosure.

FIG. 22 is a block diagram showing a receiver according to an embodiment of the disclosure. As shown, the receiver 2200 comprises a reception module 2202, a determination module 2204 and a transmission module 2206. The reception module 2202 may be configured to receive a first transmission from a transmitter. The determination module 2204 may be configured to determine first information related to one or more candidate constellation maps adapted to one or more current operating conditions, or second information usable for deriving the one or more candidate constellation maps, based on the received first transmission. The transmission module 2206 may be configured to transmit the first information or the second information to the transmitter.

Optionally, the determination module 2204 may be configured to determine the first information related to one candidate constellation map adapted to one or more current operating conditions. The reception module 2202 may be further configured to receive a second transmission from the transmitter based on the one candidate constellation map.

Optionally, the determination module 2204 may be configured to determine the second information usable for deriving one or more candidate constellation maps. The determination module 2204 may be further configured to determine a target constellation map based on the second information. The reception module 2202 may be further configured to receive a second transmission from the transmitter based on the determined target constellation map.

Optionally, the reception module 2202 may be further configured to receive, from the transmitter, third information indicating a target constellation map. The reception module 2202 may be further configured to receive a second transmission from the transmitter based on the indicated target constellation map.

Optionally, the determination module 2204 may be configured to determine the second information usable for deriving one or more candidate constellation maps. The reception module 2202 may be further configured to receive, from the transmitter, fourth information usable for deriving a target constellation map. The determination module 2204 may be further configured to determine a target constellation map based on the fourth information. The reception module 2202 may be further configured to receive a second transmission from the transmitter based on the determined target constellation map.

Optionally, the reception module 2202 may be further configured to receive, from the transmitter, at least one signaling for activating the receiver to participate in adaptation of constellation map. Optionally, the transmission module 2206 may be further configured to transmit, to the transmitter, capability information of the receiver about supporting of adaptation of constellation map.

Figure 23:
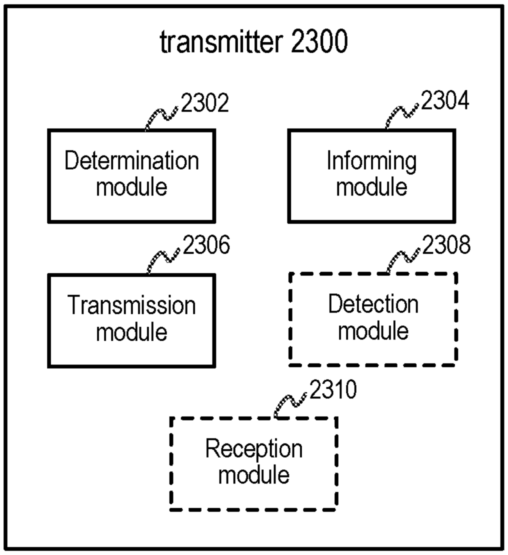
FIG. 23 is a block diagram showing a transmitter according to an embodiment of the disclosure.

FIG. 23 is a block diagram showing a transmitter according to an embodiment of the disclosure. As shown, the transmitter 2300 comprises a determination module 2302, an informing module 2304 and a transmission module 2306. The determination module 2302 may be configured to determine a target constellation map adapted to one or more operating conditions. The informing module 2304 may be configured to inform a receiver of the determined target constellation map. The transmission module 2306 may be configured to perform a transmission to the receiver based on the determined target constellation map.

Optionally, the transmitter 2300 may further comprise a detection module 2308 configured to detect at least one imperfect operating condition experienced or to be experienced by the transmitter. The target constellation map may be determined by the determination module 2302 in response to the detecting of the at least one imperfect operating condition by the detection module 2308. Optionally, the transmitter 2300 may further comprise a reception module 2310 configured to receive, from the receiver, capability information of the receiver about supporting of adaptation of constellation map. The modules described above may be implemented by hardware, or software, or a combination of both.

Now, several exemplary embodiments of the present disclosure will be described with reference to FIGS. 24-31. These embodiments relates to two communicating nodes, one transmitting and one receiving, where one of the nodes (the transmitting node or receiving node) determines the most suitable constellation map for the current operating conditions. The most suitable constellation map is over time adapted to the currently experienced imperfections in the radio link. The imperfections could e.g. be phase noise, PA nonlinearity (e.g. PA compression), filter ripple, I/Q-gain imbalance, I/Q-phase imbalance. One of the nodes selects the modulation scheme, or determines control information to be able to derive at a selected modulation to be used in the actual transmission and (optionally) communicates the selected modulation scheme/control information to the other node. The receiving node adapts its reception according to the selected/used constellation map at the transmitter.

One or more of the following units may be involved in these embodiments: a determination unit (DU), a selection unit (SU), an adaptation control unit (ACU), and a processing unit of control information (PCI). The DU may be configured to determine the most suitable constellation map based on e.g. received symbols. The most suitable constellation map could also be determined at the transmitter, knowing the mode that the DU is operating in, e.g. high frequency range with expected phase noise impairments (without explicit reception of symbols in the main transmission direction) or high transmit power and hence expected PA nonlinearities. The SU may be configured to take the decision on the constellation map to be used in the transmitting node.

The ACU may be configured to determine when to initiate an adaptation and (optionally) configure, to the transmitter and the receiver, the necessary mode to send and receive the PRS. The PRS is a signal which may be used by the DU to assist in selecting the constellation map. The ACU may also define the measurements and feedback resource and procedure parameters, i.e. probing reference signal resources, constellation maps, associated feedback channel resource and periodicity. For example, the activation module 2110 in the transmitter 2100 may be implemented as including the ACU.

The PCI may be configured to process e.g. the received symbols to extract control information to assist the DU and the SU in the selection of constellation map. The control information (CI) could be, for instance, inferred information regarding the impairments. For example, the determination module 2106 in the transmitter 2100, or the determination module 2302 in the transmitter 2300, or the determination module 2204 in the receiver 2200 may be implemented as including one or more of the DU, the SU and the PCI.

The following associated information message may be conveyed from the DU, the PCI and the SU respectively: determined constellation map (DCM), control information (CI) and selected constellation map (SCM). The DCM is the constellation map, or set of possible constellation maps, determined by the DU. The CI is the control information determined by the PCI. The SCM is the selected constellation map by the SU.

The different embodiments A-G below should not be seen as stand-alone, rather that descriptions of preceding embodiments apply also to later ones (where applicable). The cross-referencing of steps between these embodiments will be also included in the description. Specific examples will be also provided on how an evolved NR/5th generation (5G) technical specification would implement different embodiments.

Figure 24:
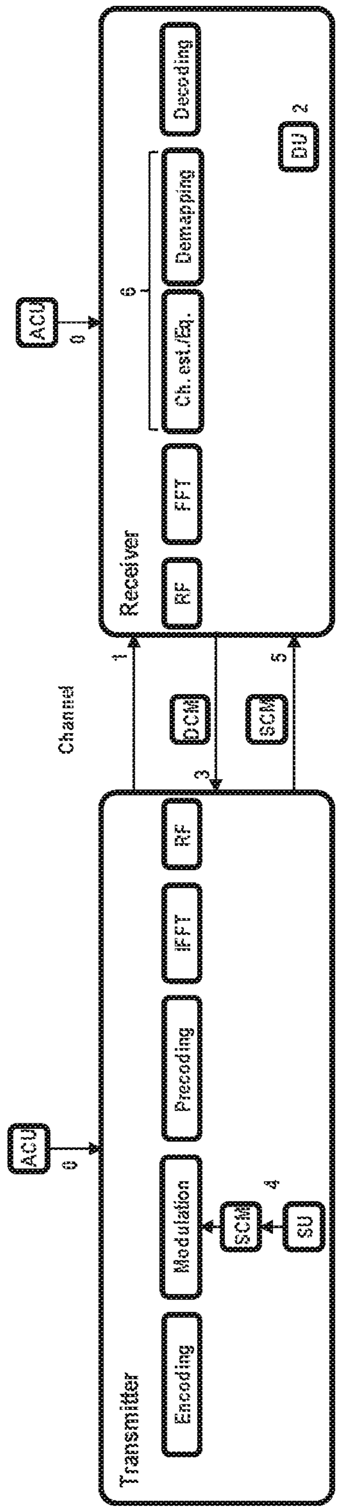
FIG. 24 is a block diagram showing a transmitter and a receiver according to an embodiment of the disclosure.
Figure 25:
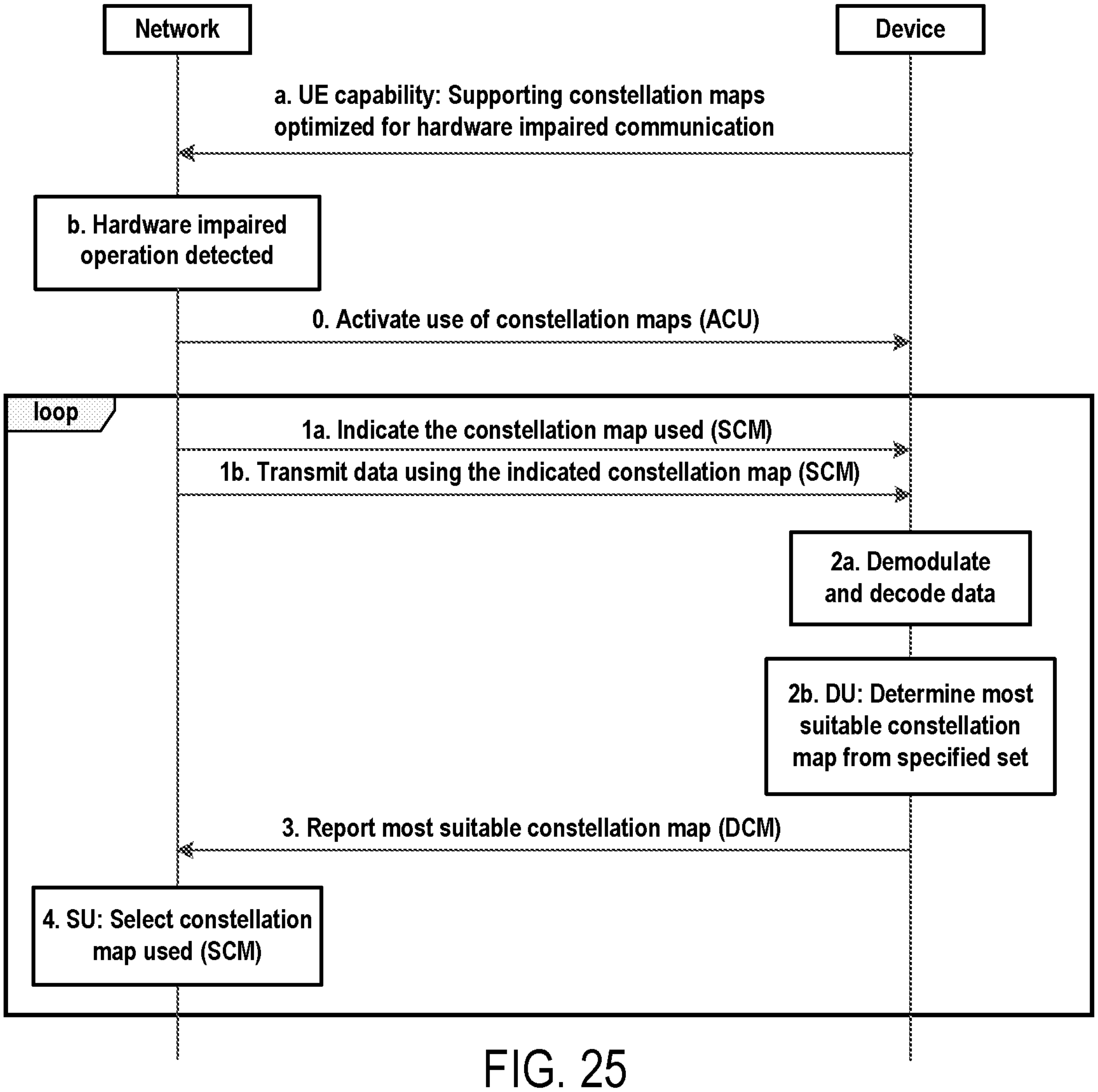
FIG. 25 is a flowchart illustrating an exemplary process according to an embodiment of the disclosure.

FIG. 24 shows embodiment A in a block diagram. By assuming the transmitter to be the network and assuming the receiver to be the device, FIG. 25 shows the process of embodiment A in a similar fashion but in a sequence diagram, where the adaptation is shown as a loop rather than a single set of steps to follow. That is, steps 1 and 5 in FIG. 24 are merged in FIG. 25. Steps 2 and 6 in FIG. 24 are merged in FIG. 25. Due to the introduction of the novel units ACU, DU and SU in this embodiment, the "modulation" block in the transmitter as well as the "channel estimation/equalization" block and the "demapping" block in the receiver may be adaptively modified.

It should be noted that the modules outlined in the transmitter and the receiver in FIG. 24 (and similar figures for the subsequent embodiments) are not exhaustive and are not representative of a generic transceiver chain. For instance, the use of inverse fast Fourier transform (IFFT) and FFT operations might not be present depending on the modulation used, or explicit precoding might not be used. They are shown merely for contextual understanding of different steps of these embodiments.

At step a, a device capability indication is included to show that the network may explicitly have to know the support of such functionality at the device side. This part may map to the functionality necessary to describe in a future standard. At step b, the network detects hardware impaired operation which may refer to an operation or condition caused by hardware impairment. Examples of such operation or condition may include, but not limited to, phase noise, PA nonlinearity, filter ripple, I/Q gain imbalance, I/Q phase imbalance, etc.

At step 0, the ACU initiates procedures for the adaptation to take place. This part may map to the functionality necessary to describe in a future standard. In different examples, the associated configurations of the procedure can be done through static (e.g. by pre-defined in the technical specification), semi-static (by long-term node-specific configuration) or dynamic (by frequent node-specific configuration) control signaling to the other node (the one where the ACU does not reside). The procedure can in one example also include the configuration of a PRS to assist the DU in the node receiving the PRS to determine the constellation map (DCM). The PRS is designed to "probe" the radio link for the imperfections, e.g. spanning a wide range of amplitudes to force the PA in the transmitter to enter compression. The configuration of the PRS may include the type of reference signal used, its placement in the overall frame structure used, its frequency of occurrence. The configuration of the procedure may also include the associated configuration of the control information reporting the DCM (or SCM). This configuration may include the type of channel to use, the radio resources to use, how the reporting is triggered, what information to include in the report and whether it is periodic, semi-statically or aperiodic (triggered on a per-need basis).

It should be noted that the ACU can reside in any of the nodes, which is indicated by including it both for the transmitter and the receiver in FIG. 24. However, a typical setting is that the ACU resides in the node with the SU, i.e. the node taking the decisions.

In an NR specific example, radio resource control (RRC) may activate adaptation and the associated control resources to be used for the reporting. RRC or downlink control information (DCI) may activate and define the specific PRS configuration to be used (if PRS is at all used).

At step 1, the transmitter sends signals to the receiver using a first modulation scheme/constellation map. The signal can be one or multiple of: signals of modulated data/payload, and pre-defined signals (e.g. signals designed for demodulation, synchronization, PRS, etc.).

In an NR specific example, this could for example be using regular 16QAM from the current NR specifications, or one of the predefined 16-ary constellation maps (as a result of the present disclosure) when transmitting the PDSCH. Alternatively, it could be transmission of a specific PRS configuration that a PDSCH is rate-matched around.

At step 2, the receiver processes the received signals using a DU, whose output is a determined constellation map (DCM) or a set of possible DCMs. This part may belong to proprietary implementation. Each DCM may represent one out of N pre-defined constellation maps in the specification. In an example, the DU may use machine learning to determine the most suitable DCM(s). This can e.g. be done using a pre-trained neural network using a softmax output of probabilities amongst the N possible pre-defined constellation maps. As an option, the DU is proprietary and hence up to receiver implementation. As another option, the DU is pre-defined in the specification. As another option, the DU is signaled to/downloaded by the receiver. In case the DU outputs a set of possible DCMs, a score may be in one example associated to each candidate, where the score can be the probability that the candidate modulation be the most desired one for the given received signal. The DCMs can be a subset of N pre-defined constellation maps in the specification. In another example, the DU may use machine learning to determine a set of suitable DCMs and the score values based on a primary objective. In another example, the DU can estimate the DCMs, during a probing period, set up by the transmitting node. Such probing period might be a time duration where different constellation maps are sent to the receiving node in pre-configured/known resources. The receiver may use a metric to compare the different constellation maps, and report the DCMs to the transmitting node. Such metric might be SER, coded or uncoded BER, BLER, soft bit magnitude, mutual information, or a metric based on the raw signal received, given the knowledge of the transmitted constellation map (similar to traditional error-vector magnitude (EVM) measurements). In another example, the probing period is not communicated to the receiver. In this case, the receiver would have to identify the constellation map used, in order to estimate the metrics mentioned above.

In an NR specific example, the DCM could be incorporated into the currently used link adaptation of channel quality index (CQI), where instead of reporting modulation and coding scheme, the CQI would rather report constellation map (and associated number of constellation points) and code rate.

At step 3, the DCM(s) is sent to the transmitter as a recommendation on what the receiver finds is the most suitable constellation map to use under current operating conditions. This part may map to the functionality necessary to describe in a future standard. In case a set of DCMs (and not just a single DCM) is sent to the transmitter, optionally also the associated score to each candidate can be included in the transmission. The DCM(s) may be chosen from a pre-defined set of constellation maps known to both transmitter and receiver. In a specific example, the recommendation could also be different depending on frequency allocation, transmission layer, and spatial filter used, and hence a multitude of recommendations would be reported to the transmitting node, for each setting of which a set of DCMs with associated scores could be signaled.

In an NR specific example, the receiver (e.g. the UE) sends the DCM through one of: PUCCH, uplink control information (UCI) on PUSCH, medium access control (MAC) control element (CE), or RRC to the gNB.

At step 4, the SU at the transmitter can either follow the recommendation from the receiver or select another constellation map for the upcoming transmission. This part may belong to proprietary implementation. In case a set of DCMs is transmitted, the selection of the constellation map from the candidates (by the SU) can be conducted based on the scores from the receiver and a secondary objective at the transmitter, e.g. transmitter specific knowledge of the upcoming transmission. The output of the SU is the selected constellation map (SCM). The reason for not following the receiver recommendation could e.g. be that the selected constellation map is not supported in the transmitter or that additional information is available at the transmitter that makes the selected constellation map believed to be more appropriate. In a specific example, the SU could be implemented by machine learning taking both the feedback from the receiver into consideration as well as information known at the transmitter (e.g. transmit power, operating frequency) to derive at a suitable SCM. This can e.g. be done using a pre-trained neural network using a softmax output of probabilities amongst the N possible pre-defined constellation maps. In one example, the SU is proprietary and hence up to receiver implementation. In another example, the SU is pre-defined in the specification. In another example, the SU is signaled to/downloaded by the receiver.

In an NR specific example, the transmitter (e.g. the gNB) follows the recommendation from the receiver (e.g. the UE) and the SU simply echoes (i.e. DCM=SCM) the signaled recommendation in the control information from the receiver.

At step 5, the decision (the SCM) is communicated to the receiving node. This part may map to the functionality necessary to describe in a future standard. In a specific example, this is achieved through separate control signaling, i.e. a separate transmission compared to the data that uses the SCM. In another example, such control signaling uses a robust modulation, such as QPSK, not sensitive to imperfections. In another example, the SCM is communicated through the selection of reference signals associated with the data transmission modulated by the SCM. In yet another example, the decision is communicated using a separate control channel signaling by indicating that the transmitter is using the constellation map indicated by the latest received DCM (lowering the control signaling overhead instead of signaling an explicit SCM).

In an NR specific example, the SCM is sent in DCI on PDCCH instructing the UE which constellation map is used for the associated PDSCH transmission. Since the DCI is transmitted using a lower modulation order, it is inherently robust to the expected imperfections having a more significant impact to the performance of higher order modulations. Such instruction in the DCI could e.g. be an updated MCS field, in which the modulation scheme indicates which constellation map (including number of constellation points) is used and the coding scheme indicates the code rate.

At step 6, the receiving node adapts its demodulation corresponding to the SCM. For example, the demodulator can apply maximum likelihood demodulation or machine learning-based (e.g. using a neural network) demodulation based on the applied constellation map.

Figure 26:
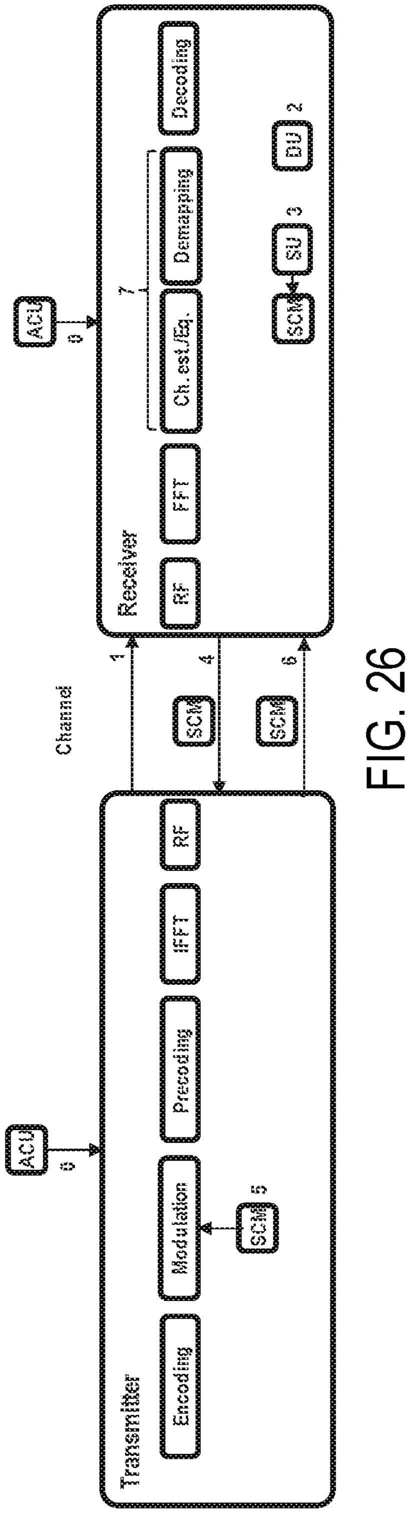
FIG. 26 is a block diagram showing a transmitter and a receiver according to an embodiment of the disclosure.

FIG. 26 shows embodiment B in a block diagram. Steps 0, 1 and 2 of this embodiment are the same as those of embodiment A respectively. At step 3, since the receiver is the node selecting the modulation in this case, the DCM=SCM and thus no explicit SU is required. It is included in FIG. 26 merely for completeness. At step 4, the SCM is sent to the transmitter. In an NR specific example, the receiver (e.g. the UE) may send the DCM through one of: PUCCH, UCI on PUSCH, MAC CE, or RRC to the gNB. At step 5, the transmitter follows the SCM. Step 6 of this embodiment is the same as step 5 of embodiment A. Step 7 of this embodiment is the same as step 6 of embodiment A.

Figure 27:
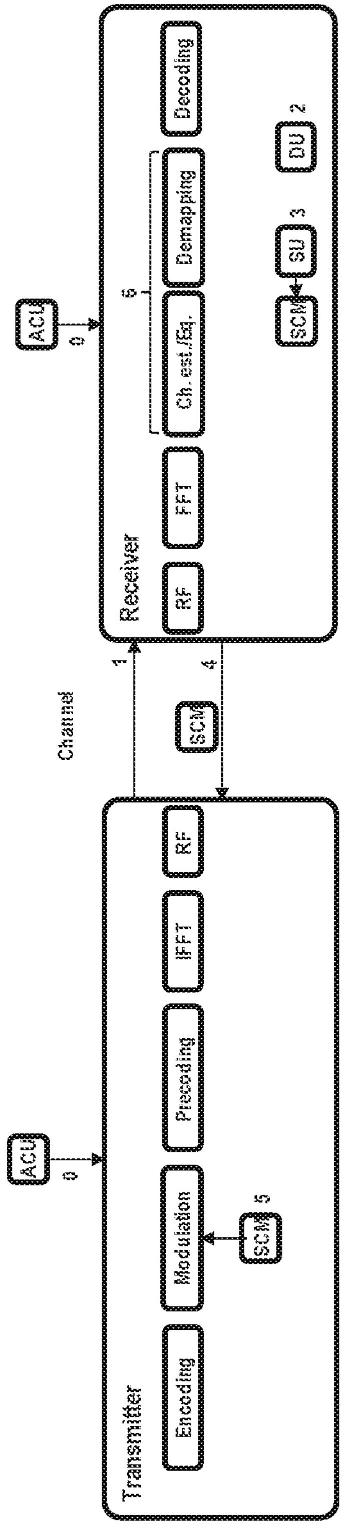
FIG. 27 is a block diagram showing a transmitter and a receiver according to an embodiment of the disclosure.

FIG. 27 shows embodiment C in a block diagram. Steps 0, 1 and 2 of this embodiment are the same as those of embodiment A respectively. Steps 3, 4 and 5 of this embodiment are the same as those of embodiment B respectively. At step 6, since the receiver takes the decision on the SCM and signals it to the transmitter, there is no need to echo the SCM back to the receiver (as in e.g. embodiment B). In an alternative example, the SCM signaled from the receiver also includes a point in time (this can be implemented in multiple ways and need not be associated with actual time, but could be associated with e.g. the frame structure of the air-interface) when the SCM is to be applied. In another example, a pre-determined rule may exist in the specification on when to apply the SCM given it is received in a certain point in time/certain frame. In an NR specific example, the gNB (the receiver) determines the SCM and sends an UL grant to the UE (the transmitter). The UL grant includes an indication of in which slot the UL transmission should occur. Step 7 of this embodiment is the same as step 6 of embodiment A.

Figure 28:
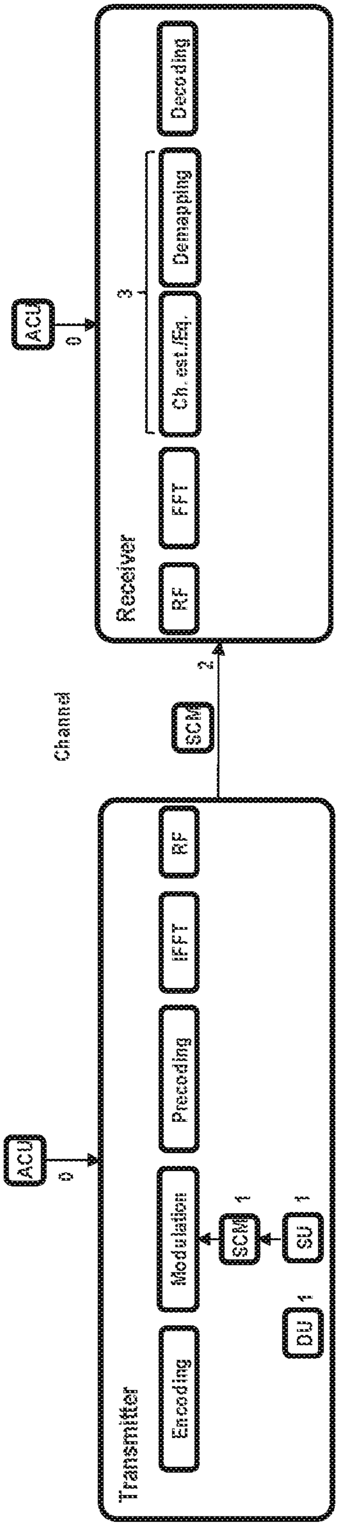
FIG. 28 is a block diagram showing a transmitter and a receiver according to an embodiment of the disclosure.

FIG. 28 shows embodiment D in a block diagram. Step 0 of this embodiment may be similar to that of embodiment A. At step 1, the transmitter both determines and selects the modulation to be used without any feedback from the receiver. This can e.g. be based on the current operating conditions where the transmitter knows the radio link will likely be severely impacted by e.g. phase noise in both the transmitter and receiver (since this imperfection is very much dependent on the frequency of operation). In another example, the transmitter observes its received data and assumes that the receiver experiences similar condition (e.g. in the presence of phase noise, this is a valid assumption). In an NR specific example, the gNB observes the received symbols, identifies that they are severely phase noise limited, assumes that the UE experiences similar conditions, and selects an appropriate constellation map. Steps 2 and 3 of this embodiment are the same as steps 5 and 6 of embodiment A respectively.

Figure 29:
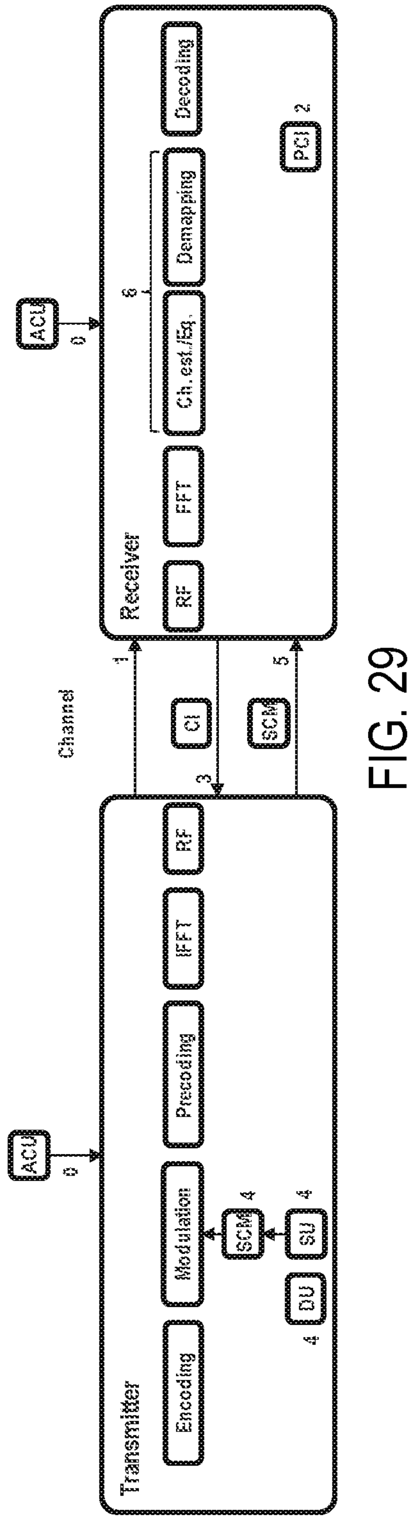
FIG. 29 is a block diagram showing a transmitter and a receiver according to an embodiment of the disclosure.

FIG. 29 shows embodiment E in a block diagram. Steps 0 and 1 of this embodiment are the same as those of embodiment A respectively. At step 2, the PCI in the receiving node estimates control information based on the received signal from the transmitting node (describing the imperfections experienced). In an example, the parameters can include for example the phase noise power level, the PA nonlinearity level. Each metric of the received signal may be predefined how to calculate. The PCI can use a neural network to infer hardware impairment model parameters from the received signal, or can use a neural network to classify the received signal based on the hardware impairments. If a neural network is used, the configuration of such neural network can be provided by the ACU. The neural network can be pre-configured in the specification, or signaled to the transmitting or receiving node (depending on which node is the primary node for such decision). Such signaling can also be combined having part of the model pre-configured and part of the model signaled.

At step 3, the receiver feeds back control information (CI) to the transmitter. Such CI could be the estimated hardware impairment model parameters (quantized appropriately) or the index of the class of the classified hardware impairment to the transmitter. In an NR specific example, the CI could be transmitted on PUCCH, UCI on PUSCH, MAC CE, or RRC. At step 4, the transmitter both determines (DU) and selects (SU) the constellation map to be used based on the CI received and the current operating conditions known to the transmitter. In one example, this selection may be done by using a neural network that produces the constellation map given the CI. Steps 5 and 6 of this embodiment are the same as those of embodiment A respectively.

Figure 30:
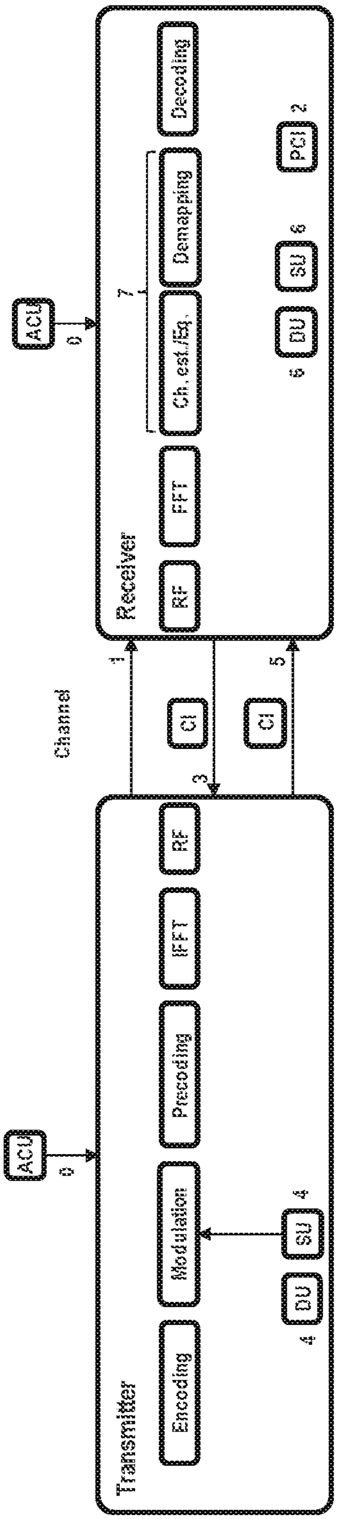
FIG. 30 is a block diagram showing a transmitter and a receiver according to an embodiment of the disclosure.

FIG. 30 shows embodiment F in a block diagram. Steps 0 and 1 of this embodiment are the same as those of embodiment A respectively. Steps 2 and 3 of this embodiment are the same as those of embodiment E respectively. At step 4, the DU derives a constellation map to use (e.g. not necessarily from a set of predefined constellation maps but a generated map by the DU) and selects (SU) the constellation map to be used based on the CI received and the current operating conditions known to the transmitter. Both sources of information may be used to derive at an updated CI used as input to the DU. At step 5, since it is costly to send the explicit constellation map to the receiving node, the updated CI is instead transmitted to the receiving node. At step 6, the receiving node uses the same DU and SU as in the transmitter to derive at the constellation map to use, using the updated CI as input. The DU and SU could e.g. be implemented as neural networks and might be pre-defined in the specification or defined as part of the ACU procedures in step 0. In an NR specific example, the CI is sent in DCI on PDCCH instructing the UE which constellation map is used for the associated PDSCH transmission. Since the DCI is transmitted using a lower modulation order, it is inherently robust to the expected imperfections having a more significant impact to the performance of higher order modulations. Step 7 of this embodiment is the same as step 6 of embodiment A.

Figure 31:
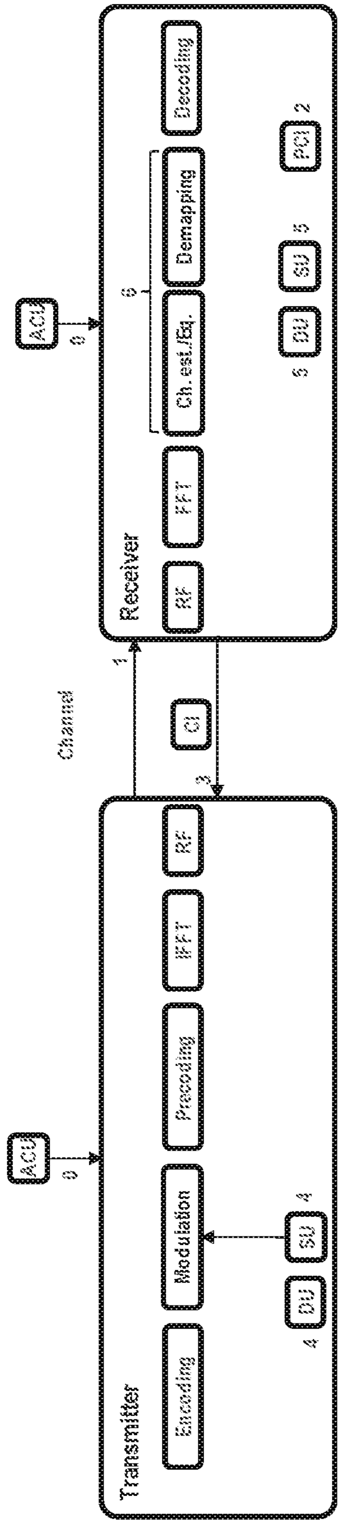
FIG. 31 is a block diagram showing a transmitter and a receiver according to an embodiment of the disclosure.

FIG. 31 shows embodiment G in a block diagram. Steps 0 and 1 of this embodiment are the same as those of embodiment A respectively. Steps 2 and 3 of this embodiment are the same as those of embodiment E respectively. At step 4, the DU derives a constellation map to use (e.g. not necessarily from a set of predefined constellation maps but a generated map by the DU) and selects (SU) the constellation map to be used based on the CI received. At step 5, since the receiver takes the decision on the CI and signals it to the transmitter, there is no need to echo the CI back to the receiver (as in e.g. embodiment F where the transmitter was allowed to change the CI to an updated CI). In an alternative example, the CI signaled from the receiver also include a point in time. This can be implemented in multiple ways and need not be associated with actual time, but could be associated with e.g. the frame structure of the air-interface when the CI is to be applied. In another example, a pre-determined rule exists in the specification on when to apply the CI given it is received in a certain point in time/certain frame. At step 6, the receiving node uses the same DU and SU as in the transmitter to derive at the constellation map to use, using the earlier derived CI as input. The DU and SU could e.g. be implemented as neural networks and might be pre-defined in the specification or defined as part of the ACU procedures in step 0. Step 7 of this embodiment is the same as step 6 of embodiment A.

Note that if baseband operation is virtualized, the present disclosure would also be applicable to a cloud implementation. Both new functionality (e.g. DU, SU, ACU, PCI) and existing modified functionality (e.g. the "modulation" block in the transmitter as well as the "channel estimation/equalization" block and the "demapping" block in the receiver) as identified in FIG. 24 and FIGS. 26-31 would be applicable to cloud implementation in that case. Thus, the present disclosure would touch upon both traditional 3GPP standards but might also have additional impact to an open radio access network (O-RAN) specification. This could for example be how the machine learning models mentioned above are configured.

Figure 32:
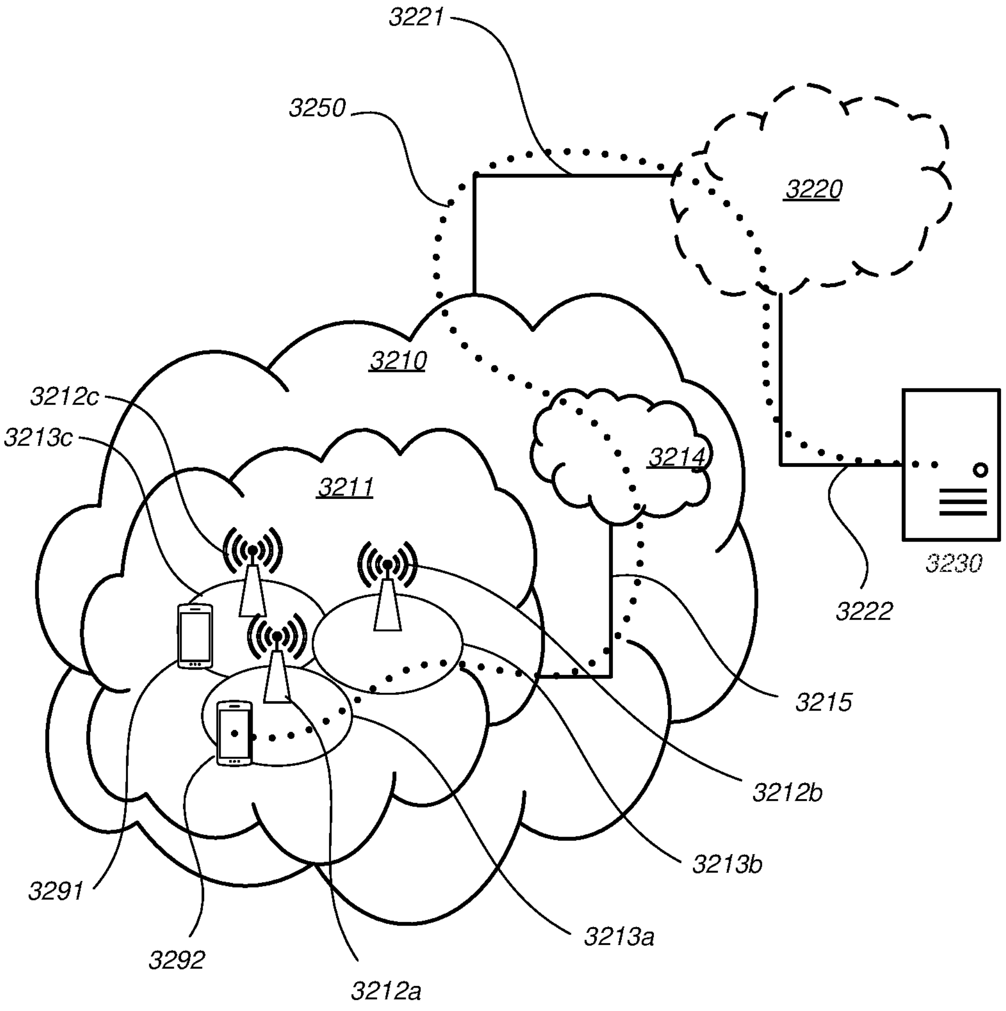
FIG. 32 is a diagram showing a telecommunication network connected via an intermediate network to a host computer in accordance with some embodiments.

With reference to FIG. 32, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 32 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 33. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 33) served by base station 3320. Communication interface 3326 may be configured to facilitate connection 3360 to host computer 3310. Connection 3360 may be direct or it may pass through a core network (not shown in FIG. 33) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 33:
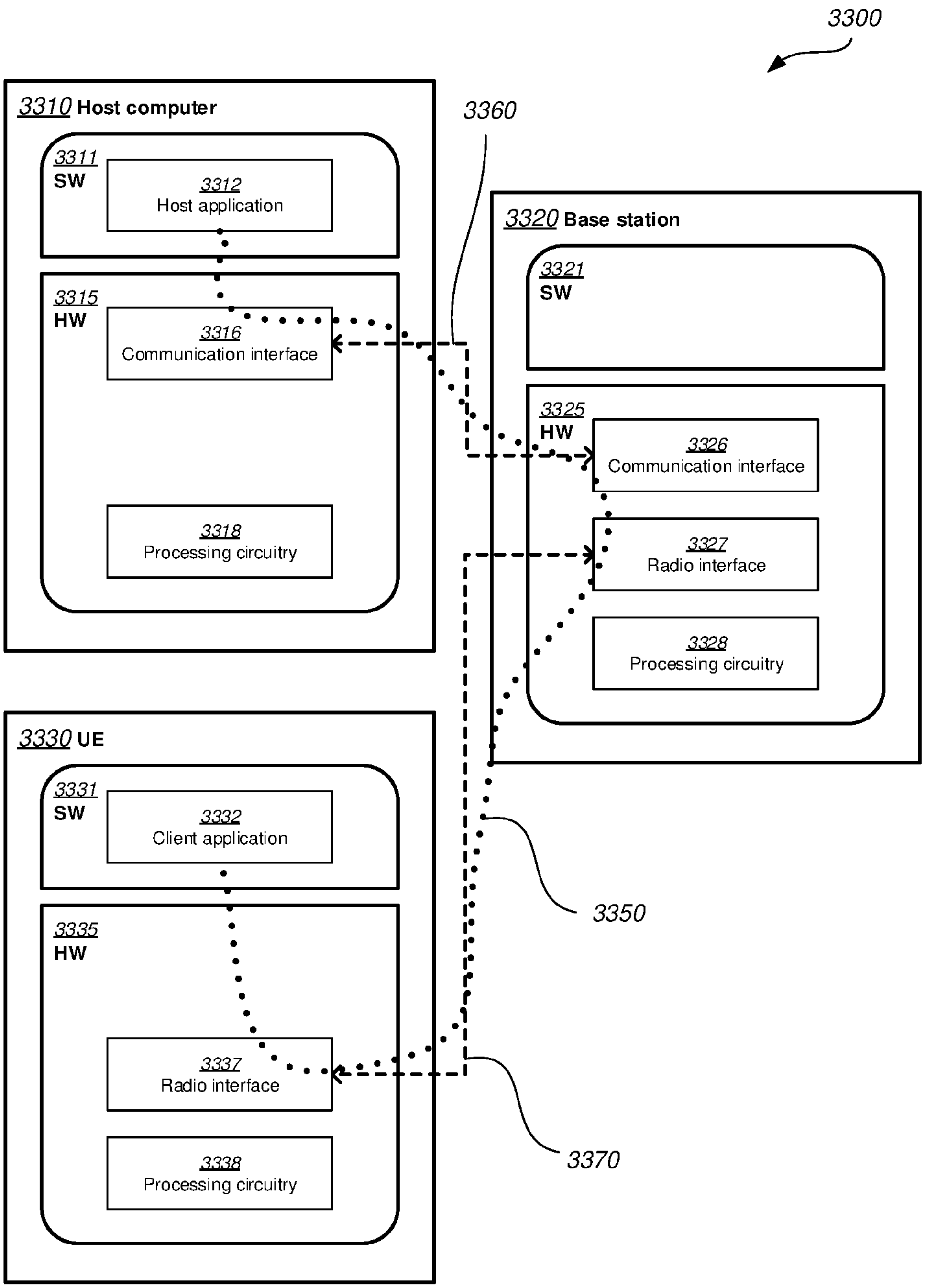
FIG. 33 is a diagram showing a host computer communicating via a base station with a user equipment in accordance with some embodiments.

It is noted that host computer 3310, base station 3320 and UE 3330 illustrated in FIG. 33 may be similar or identical to host computer 3230, one of base stations 3212*a*, 3212*b*, 3212*c* and one of UEs 3291, 3292 of FIG. 32, respectively. This is to say, the inner workings of these entities may be as shown in FIG. 33 and independently, the surrounding network topology may be that of FIG. 32.

In FIG. 33, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 34:
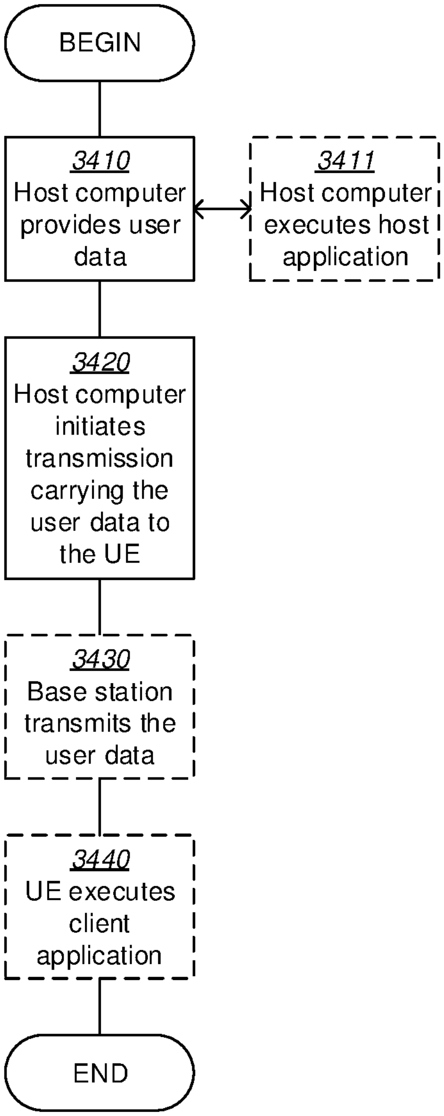
FIG. 34 is a flowchart illustrating a method implemented in a communication system in accordance with some embodiments.

FIG. 34 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 34 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 35:
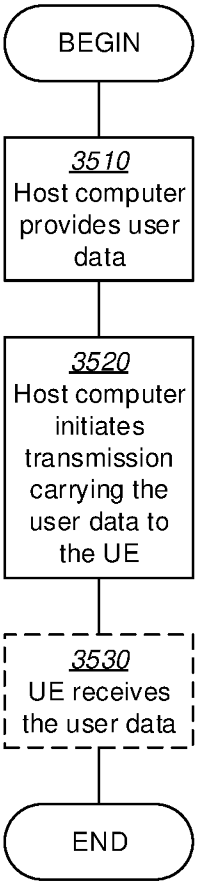
FIG. 35 is a flowchart illustrating a method implemented in a communication system in accordance with some embodiments.

FIG. 35 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 35 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 36:
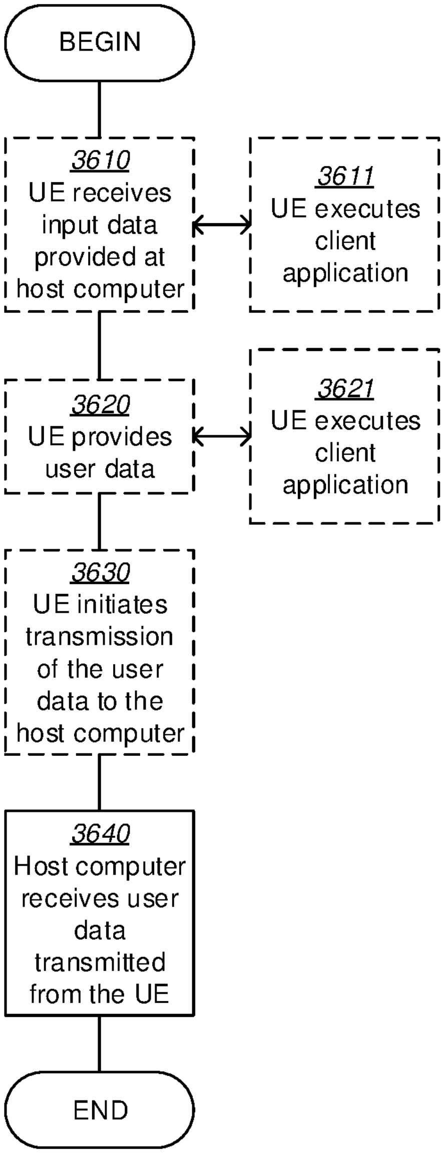
FIG. 36 is a flowchart illustrating a method implemented in a communication system in accordance with some embodiments.

FIG. 36 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 36 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 37:
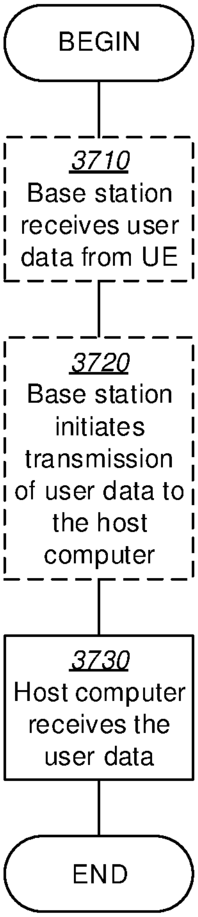
FIG. 37 is a flowchart illustrating a method implemented in a communication system in accordance with some embodiments.

FIG. 37 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 37 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

In an aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may perform a first transmission to the terminal device. The base station may receive, from the terminal device, first information related to one or more candidate constellation maps adapted to one or more current operating conditions, or second information usable for deriving the one or more candidate constellation maps. The base station may determine a target constellation map based at least on the first information or the second information. The base station may perform a second transmission to the terminal device based on the determined target constellation map.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

In another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to perform a first transmission to the terminal device. The base station's processing circuitry may be configured to receive, from the terminal device, first information related to one or more candidate constellation maps adapted to one or more current operating conditions, or second information usable for deriving the one or more candidate constellation maps. The base station's processing circuitry may be configured to determine a target constellation map based at least on the first information or the second information. The base station's processing circuitry may be configured to perform a second transmission to the terminal device based on the determined target constellation map.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

In still another aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The terminal device may receive a first transmission from the base station. The terminal device may determine first information related to one or more candidate constellation maps adapted to one or more current operating conditions, or second information usable for deriving the one or more candidate constellation maps, based on the received first transmission. The terminal device may transmit the first information or the second information to the base station.

In an embodiment of the disclosure, the method may further comprise, at the terminal device, receiving the user data from the base station.

In still another aspect of the disclosure, there is provided a communication system including a host computer comprising processing circuitry configured to provide user data and a communication interface configured to forward user data to a cellular network for transmission to a terminal device. The terminal device may comprise a radio interface and processing circuitry. The processing circuitry of the terminal device may be configured to receive a first transmission from the base station. The processing circuitry of the terminal device may be configured to determine first information related to one or more candidate constellation maps adapted to one or more current operating conditions, or second information usable for deriving the one or more candidate constellation maps, based on the received first transmission. The processing circuitry of the terminal device may be configured to transmit the first information or the second information to the base station.

In an embodiment of the disclosure, the communication system may further include the terminal device.

In an embodiment of the disclosure, the cellular network may further include a base station configured to communicate with the terminal device.

In an embodiment of the disclosure, the processing circuitry of the host computer may be configured to execute a host application, thereby providing the user data. The processing circuitry of the terminal device may be configured to execute a client application associated with the host application.

In still another aspect of the disclosure, there is provided a method implemented in a communication system including a host computer, a base station and a terminal device. The method may comprise, at the host computer, receiving user data transmitted to the base station from the terminal device. The terminal device may receive a first transmission from the base station. The terminal device may determine first information related to one or more candidate constellation maps adapted to one or more current operating conditions, or second information usable for deriving the one or more candidate constellation maps, based on the received first transmission. The terminal device may transmit the first information or the second information to the base station.

In an embodiment of the disclosure, the method may further comprise, at the terminal device, providing the user data to the base station.

In an embodiment of the disclosure, the method may further comprise, at the terminal device, executing a client application, thereby providing the user data to be transmitted. The method may further comprise, at the host computer, executing a host application associated with the client application.

In an embodiment of the disclosure, the method may further comprise, at the terminal device, executing a client application. The method may further comprise, at the terminal device, receiving input data to the client application. The input data may be provided at the host computer by executing a host application associated with the client application. The user data to be transmitted may be provided by the client application in response to the input data.

In still another aspect of the disclosure, there is provided a communication system including a host computer comprising a communication interface configured to receive user data originating from a transmission from a terminal device to a base station. The terminal device may comprise a radio interface and processing circuitry. The processing circuitry of the terminal device may be configured to receive a first transmission from the base station. The processing circuitry of the terminal device may be configured to determine first information related to one or more candidate constellation maps adapted to one or more current operating conditions, or second information usable for deriving the one or more candidate constellation maps, based on the received first transmission. The processing circuitry of the terminal device may be configured to transmit the first information or the second information to the base station.

In an embodiment of the disclosure, the communication system may further include the terminal device.

In an embodiment of the disclosure, the communication system may further include the base station. The base station may comprise a radio interface configured to communicate with the terminal device and a communication interface configured to forward to the host computer the user data carried by a transmission from the terminal device to the base station.

In an embodiment of the disclosure, the processing circuitry of the host computer may be configured to execute a host application. The processing circuitry of the terminal device may be configured to execute a client application associated with the host application, thereby providing the user data.

In an embodiment of the disclosure, the processing circuitry of the host computer may be configured to execute a host application, thereby providing request data. The processing circuitry of the terminal device may be configured to execute a client application associated with the host application, thereby providing the user data in response to the request data.

In still another aspect of the disclosure, there is provided a method implemented in a communication system including a host computer, a base station and a terminal device. The method may comprise, at the host computer, receiving, from the base station, user data originating from a transmission which the base station has received from the terminal device. The base station may perform a first transmission to the terminal device. The base station may receive, from the terminal device, first information related to one or more candidate constellation maps adapted to one or more current operating conditions, or second information usable for deriving the one or more candidate constellation maps. The base station may determine a target constellation map based at least on the first information or the second information.

The base station may perform a second transmission to the receiver based on the determined target constellation map.

In an embodiment of the disclosure, the method may further comprise, at the base station, receiving the user data from the terminal device.

In an embodiment of the disclosure, the method may further comprise, at the base station, initiating a transmission of the received user data to the host computer.

In still another aspect of the disclosure, there is provided a communication system including a host computer comprising a communication interface configured to receive user data originating from a transmission from a terminal device to a base station. The base station comprises a radio interface and processing circuitry. The base station's processing circuitry may be configured to perform a first transmission to the terminal device. The base station's processing circuitry may be configured to receive, from the terminal device, first information related to one or more candidate constellation maps adapted to one or more current operating conditions, or second information usable for deriving the one or more candidate constellation maps. The base station's processing circuitry may be configured to determine a target constellation map based at least on the first information or the second information. The base station's processing circuitry may be configured to perform a second transmission to the receiver based on the determined target constellation map.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application. The terminal device may be configured to execute a client application associated with the host application, thereby providing the user data to be received by the host computer.

In still another aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may determine a target constellation map adapted to one or more operating conditions. The base station may inform the terminal device of the determined target constellation map. The base station may perform a transmission to the receiver based on the determined target constellation map.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

In still another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to determine a target constellation map adapted to one or more operating conditions. The base station's processing circuitry may be configured to inform the terminal device of the determined target constellation map. The base station's processing circuitry may be configured to perform a transmission to the receiver based on the determined target constellation map.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements. It should be noted that two blocks shown in succession in the above figures may, in fact, be executed substantially concurrently, or the blocks may sometimes be executed in the reverse order, depending upon the functionality involved.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a transmitter, comprising:
performing a first transmission to a receiver;
receiving, from the receiver, first information related to one or more candidate constellation maps adapted to one or more current operating conditions, or second information usable for deriving the one or more candidate constellation maps;
determining a target constellation map based at least on the first information or the second information; and
performing a second transmission to the receiver based on the determined target constellation map, wherein the first information indicates, for each of the one or more candidate constellation maps, a degree of adaptation of the candidate constellation map to one or more current operating conditions, and wherein the degree of adaptation represents, for each of the one or more candidate constellation maps, how well that candidate constellation map is adapted to the one or more current operating conditions in view of at least one performance-related characteristic associated with that candidate constellation map.

2. The method according to claim 1, wherein determining the target constellation map comprises: determining, as the target constellation map, one of the one or more candidate constellation maps.

3. The method according to claim 1, wherein the target constellation map is determined based further on third information that is available at the transmitter.

4. The method according to claim 3, wherein determining the target constellation map comprises: determining, as the target constellation map, a different constellation map than the one or more candidate constellation maps, or one of the one or more candidate constellation maps.

5. The method according to claim 1, further comprising:
informing the receiver of the target constellation map or fourth information usable for deriving the target constellation map.

6. The method according to claim 5, wherein the fourth information is determined based on the second information and third information that is available at the transmitter.

7. The method according to claim 5, wherein the target constellation map or the fourth information is informed by a signaling.

8. The method according to claim 1, further comprising:
activating the receiver to participate in adaptation of constellation map.

9. The method according to claim 8, wherein activating the receiver to participate in adaptation of constellation map comprises one or more of:
transmitting, to the receiver, a configuration for a probing reference signal (PRS) that is to be transmitted to the receiver;
allocating, to the receiver, resources for reporting of the first information or the second information to the transmitter; and
transmitting, to the receiver, a configuration for reporting of the first information or the second information to the transmitter.

10. The method according to claim 8, further comprising:
detecting at least one imperfect operating condition experienced or to be experienced by the transmitter,
wherein the receiver is activated in response to the detecting of the at least one imperfect operating condition.

11. A method performed by a receiver, comprising:
receiving a first transmission from a transmitter;
determining first information related to one or more candidate constellation maps adapted to one or more current operating conditions, or second information usable for deriving the one or more candidate constellation maps, based on the received first transmission;
transmitting the first information or the second information to the transmitter; and
receiving a second transmission from the transmitter based on the one candidate constellation map, wherein the first information indicates, for each of the one or more candidate constellation maps, a degree of adaptation of the candidate constellation map to one or more current operating conditions, and wherein the degree of adaptation represents, for each of the one or more candidate constellation maps, how well that candidate constellation map is adapted to the one or more current operating conditions in view of at least one performance-related characteristic associated with that candidate constellation map.

12. The method according to claim 11, wherein the first information related to one candidate constellation map adapted to one or more current operating conditions is determined.

13. The method according to claim 11, wherein the second information usable for deriving one or more candidate constellation maps is determined, and wherein the method further comprises:

determining a target constellation map based on the second information; and receiving a second transmission from the transmitter based on the determined target constellation map.

14. The method according to claim 11, further comprising:

receiving, from the transmitter, third information indicating a target constellation map; and receiving a second transmission from the transmitter based on the indicated target constellation map.

15. The method according to claim 14, wherein the second information usable for deriving one or more candidate constellation maps is determined, and wherein the method further comprises:

receiving, from the transmitter, fourth information usable for deriving a target constellation map;

determining a target constellation map based on the fourth information; and receiving a second transmission from the transmitter based on the determined target constellation map.

16. The method according to claim 15, wherein the third information or the fourth information is received by a signaling.

17. The method according to claim 11, further comprising:

receiving, from the transmitter, at least one signaling for activating the receiver to participate in adaptation of constellation map.

18. The method according to claim 17, wherein the at least one signaling comprises one or more of:

a configuration for a probing reference signal (PRS) that is to be transmitted to the receiver;

a signaling for allocating, to the receiver, resources for reporting of the first information or the second information to the transmitter; and a configuration for reporting of the first information or the second information to the transmitter.

19. The method according to claim 11, further comprising:

transmitting, to the transmitter, capability information of the receiver about supporting of adaptation of constellation map.

20. The method according to claim 11, wherein the one or more current operating conditions comprise:

at least one imperfect operating condition experienced by the receiver and/or the transmitter.

* * * * *